(12) United States Patent
Hu et al.

(10) Patent No.: US 10,572,720 B2
(45) Date of Patent: Feb. 25, 2020

(54) VIRTUAL REALITY-BASED APPARATUS AND METHOD TO GENERATE A THREE DIMENSIONAL (3D) HUMAN FACE MODEL USING IMAGE AND DEPTH DATA

(71) Applicant: SONY CORPORATION, Tokyo (JP)

(72) Inventors: Jie Hu, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 15/861,826

(22) Filed: Jan. 4, 2018

(65) Prior Publication Data

US 2018/0253593 A1    Sep. 6, 2018

Related U.S. Application Data

(60) Provisional application No. 62/465,534, filed on Mar. 1, 2017.

(51) Int. Cl.
*G06T 13/00* (2011.01)
*G06K 9/00* (2006.01)
*G06T 13/40* (2011.01)

(52) U.S. Cl.
CPC ..... *G06K 9/00315* (2013.01); *G06K 9/00248* (2013.01); *G06K 9/00281* (2013.01); *G06T 13/40* (2013.01)

(58) Field of Classification Search
CPC .................................. G06T 13/40; G06T 17/00
See application file for complete search history.

(56) References Cited

U.S. PATENT DOCUMENTS 9,235,928 B2  1/2016  Medioni et al.
9,317,954 B2  4/2016  Li et al.
(Continued)

FOREIGN PATENT DOCUMENTS

EP   3026636 A1   6/2016
EP   3186787 A1   7/2017
(Continued)

OTHER PUBLICATIONS

Zollhofer, et al., "Automatic Reconstruction of Personalized Avatars from 3D Face Scans", Computer Animation and Virtual Worlds, vol. 22, Apr. 12, 2011, pp. 195-202.

(Continued)

*Primary Examiner* — Charles Tseng
(74) *Attorney, Agent, or Firm* — Chip Law Group

(57) ABSTRACT

A virtual reality-based apparatus and method to generate a 3D human face model includes, storage of a 3D face model that is an existing 3D face model or a mean-shape face model in at least a neutral expression. A point cloud of the face of the first user is generated based on the plurality of color images and depth information of the face of the first user. A first 3D face model of the first user having neutral expression is generated by a shape-based model-fitment on the stored 3D face model. A shape of the first 3D face model is refined based on a difference between the first 3D face model, the shape-based model-fitment, and the generated point cloud. The display of the refined first 3D face model is controlled to exhibit a minimum deviation from the shape and appearance of the face of the first user.

14 Claims, 16 Drawing Sheets

(56) References Cited

U.S. PATENT DOCUMENTS

| | | | |
|---|---|---|---|
| 9,378,576 | B2 | 6/2016 | Bouaziz et al. |
| 2015/0035825 | A1* | 2/2015 | Zhou ...................... G06T 13/40 345/419 |
| 2015/0042663 | A1* | 2/2015 | Mandel ................... G06T 13/80 345/474 |
| 2016/0148425 | A1 | 5/2016 | Hwang et al. |
| 2017/0206095 | A1* | 7/2017 | Gibbs ..................... G06F 3/167 |
| 2017/0278302 | A1 | 9/2017 | Varanasi et al. |
| 2018/0018819 | A1 | 1/2018 | Hwang et al. |

FOREIGN PATENT DOCUMENTS

| | | |
|---|---|---|
| JP | 2002-015310 A | 1/2002 |
| JP | 2002-216161 A | 8/2002 |
| JP | 2007-257324 A | 10/2007 |
| JP | 2016-501396 A | 1/2016 |
| KR | 10-2016-0062572 A | 6/2016 |
| WO | 2016/030305 A1 | 3/2016 |
| WO | 2017/029488 A2 | 2/2017 |

OTHER PUBLICATIONS

Blanz, et al., "A Morphable Model for the Synthesis of 3D faces", Computer Graphics Proceedings, Jul. 1999, pp. 187-194.

Blanz, et al., "Fitting a Morphable Model to 3D Scans of Faces", IEEE 2007, pp. 1-8.

Alomari, et al., "A State of Art on 3D Face Modeling Approaches", International Conference on Electrical Engineering and Informatics, Jul. 17-19, 2011, pp. 1-5.

Partial European Search Report of EP Application No. 18156120.0, dated Jun. 22, 2018, 15 pages of PESR.

Office Action for JP Patent Application No. 2018-024718, dated Apr. 17, 2019, 04 pages of Office Action and 06 pages of English Translation.

Choi, et al., "Basic Generation and Description of Facial Images Using Prinicpal-Component Analysis", Graphics and CAD, vol. 90, No. 65, Aug. 18, 1990, pp. 43-50 (English Abstract only).

Maejima, et al., "Fast Automatic 3D Face Model Generation From a Face Image Based on Prior Knowledge of Facial Geometries", Jun. 9, 2010, pp. IS3-13-1 to IS3-13-6.

Extended European Search Report of EP Patent Application No. 18156120.0 dated Nov. 8, 2018, 15 pages.

Roth, et al., "Adaptive 3D Face Reconstruction from Unconstrained Photo Collections", 2016 IEEE Conference on Computer Vision and Pattern Recognition, 4197-4206 pages , 2016.

Besl, et al., "A Method for Registration of 3-D Shapes", 8180 IEEE Transactions on Pattern Analysis and Machine Intelligence, Feb. 14, 1992, 239-256 pages.

"CSE 554 Lecture 8: Laplacian Deformation" School of Engineering & Applied Sciences, Washington University in St. Louis, 52 pages , 2012.

Zollhoefer, et al., "Automatic Reconstruction of Personalized Avatars from 3D Face Scans", Compute Animation and Virtual Worlds, vol. 22, No. 2-3, Apr. 12, 2011, 08 pages.

Blanz, et al., "A Morphable Model for the Synthesis of 3D Faces", 08 pages , 1999.

Blanz, et al., "Fitting a Morphable Model to 3D Scans of Faces", 20 pages , 2007.

Alomari, et al., "A State of Art on 3D Face Modeling Approaches", 2011 International Conference on Electrical Engineering and Informatics, Jul. 17-19, 2011, 06 pages.

Office Action for KR Patent Application No. 10-2018-0016691, dated Mar. 10, 2019, 11 pages of Office Action and 14 pages of English Translation.

Zollhofer, et al., "Automatic Reconstruction of Personalized Avatars from 3D Face Scans", Computer Animation and Virtual Worlds, Apr. 12, 2011, pp. 195-202.

Blanz, et al., "A Morphable Model for the Synthesis of 3D Faces", SIGGRAPH 99, ACM, Jul. 1, 1999, pp. 187-194.

Casas, et al., "Rapid Photorealistic Blendshape Modeling from RGB-D Sensors", May 23-25, 2016, 09 pages.

Kazemi, et al., "Real-time Face Reconstruction from a Single Depth Image", KTH Royal Institute of Technology Microsoft Research, 08 pages, 2014.

* cited by examiner

US 10,572,720 B2

VIRTUAL REALITY-BASED APPARATUS AND METHOD TO GENERATE A THREE DIMENSIONAL (3D) HUMAN FACE MODEL USING IMAGE AND DEPTH DATA

CROSS-REFERENCE TO RELATED APPLICATIONS/INCORPORATION BY REFERENCE

This application claims priority to U.S. Provisional Patent Application Ser. No. 62/465,534 filed on Mar. 1, 2017, the entire content of which is hereby incorporated herein by reference.

FIELD

Various embodiments of the disclosure relate to three-dimensional (3D) modeling, virtual human technology, and virtual reality. More specifically, various embodiments of the disclosure relate to a virtual reality-based apparatus and method to generate a 3D human face model using image and depth data.

BACKGROUND

Advancements in the field of three-dimensional (3D) computer graphics, modeling have provided the ability to create 3D models and visualize real objects in a 3D computer graphics environment. 3D content, such as a 3D character model, is increasingly used in animated movies, games, and virtual-reality systems to enhance user experience. A 3D model is a static 3D mesh that resembles the shape of a particular object. Typically, such a 3D model is manually designed by computer graphics artists, commonly known as modelers, by use of a modeling software application. Such a 3D model may not be used in the same way in animation, or various virtual reality systems or applications. Further, in some instances, a face portion of the 3D model may be considered as one of the most important portions of the 3D model. Currently, creating a realistic 3D human face model has been one of the most difficult problems in the fields of computer graphics and computer vision. With the increasing application of 3D virtual human technology in the areas of virtual reality, 3D gaming, and virtual simulation, developing technologies to generate a realistic 3D human face model based on real people has become increasingly important.

In certain scenarios, a 3D face modeler may utilize the input image of a face of a user as the basis to construct the 3D model. The 3D face modeler may construct a surface representation of the human face, such as a mesh. The face modeler may also introduce various expressions of the human's face, to the 3D face model by constructing various blend shapes. There are several complexities involved in capturing the input image data from various viewing angles required to create the 3D face model. Further, the 3D model of the face of the user may not resemble actual facial details of the user. For instance, structure and surface representation of the human face may not resemble the face of the user and the expressions of the face model may not match the expressions of the human face in real time or near-real time. This discrepancy in the structure, features, and expressions of the 3D face model with respect to the actual face of the user may not be desirable for realistic viewing purposes and virtual reality applications.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A virtual reality-based apparatus and method to generate a three dimensional (3D) human face model using image and depth data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
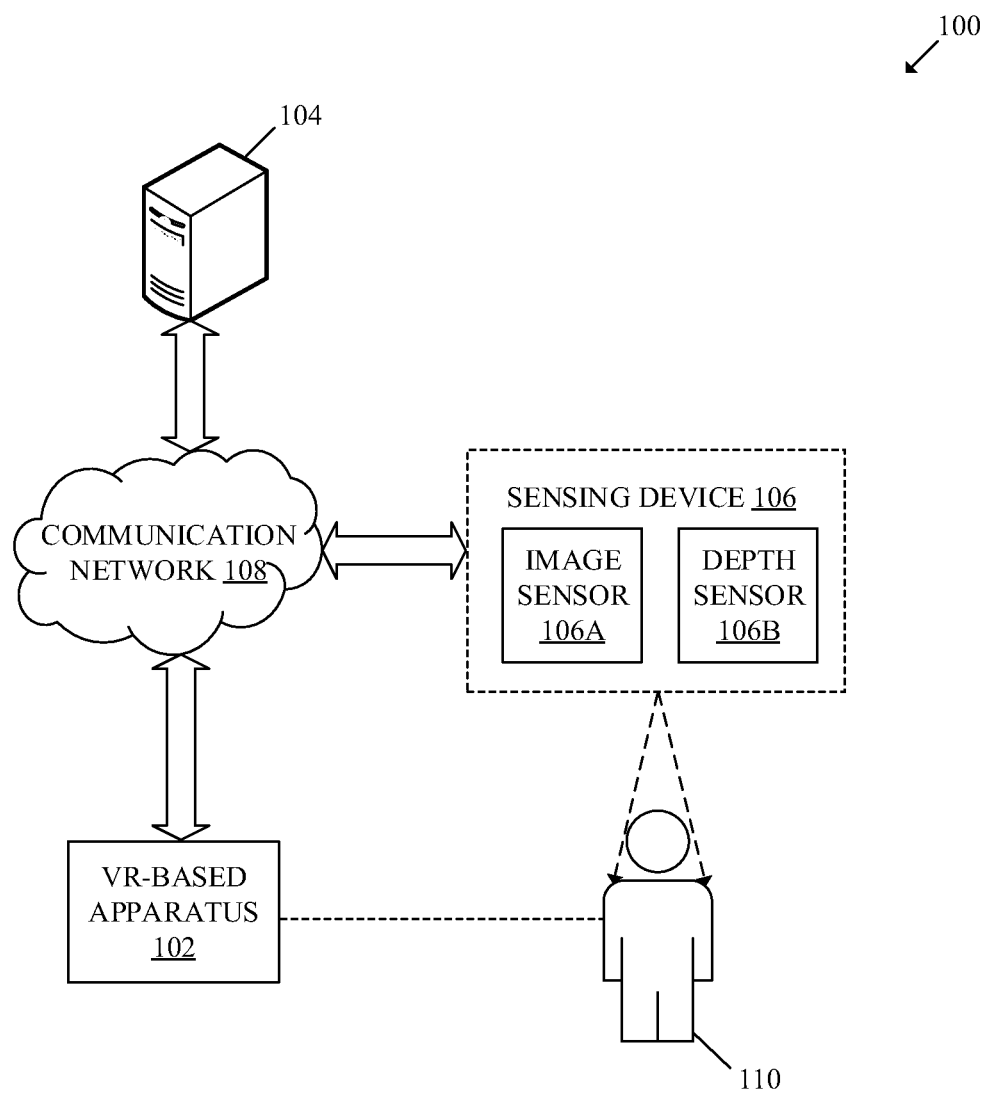
FIG. 1 is a block diagram that illustrates an exemplary network environment to generate a 3D human face model, in accordance with an embodiment of the disclosure.

The following described implementations may be found in the disclosed virtual reality (VR)-based apparatus and method to generate a 3D human face model using RGBD data. Exemplary aspects of the disclosure may include the VR-based apparatus that may be communicatively coupled to a sensing device. The VR-based apparatus may include a memory device configured to store a 3D face model. The stored 3D face model may be an existing 3D face model, for example a principle component analysis (PCA) model, pre-stored in the memory device. The PCA model may be built from a scanning and registering of a plurality of different faces, for example, about 100-300 faces of different users. The plurality of different faces of different users may include both female and male gender faces for better representation.

The VR-based apparatus may be configured to generate a point cloud of the face of a first user based on a plurality of color images and corresponding depth information of the face of the first user. The plurality of color images and corresponding depth information of the first user may be captured by the sensing device from one or more viewing angles of the face in a neutral expression. The VR-based apparatus may be further configured to generate a first 3D face model of the face of the first user with a neutral expression by a shape-based model-fitment on the stored 3D face model (that is the existing 3D face model) using the generated point cloud. The VR-based apparatus may refine a shape of the first 3D face model based on a difference between the first 3D face model and the generated point cloud of the face of the first user, and also based on the shape-based model-fitment. The VR-based apparatus may be further configured to control display of the refined first 3D face model of the face of the first user on the virtual reality-based apparatus. The display control of the refined first 3D face model may be done such that a plurality of appearance attributes on the refined first 3D face model exhibit a minimum deviation from the shape and appearance of the face of the first user in the captured plurality of color images.

In accordance with an embodiment, the memory device may be further configured to also store a mean-shape face model in the neutral expression and a plurality of shape components of the mean-shape face model as a part of the stored 3D face model, and a plurality of arbitrary facial expressions related to the mean-shape face model. For example, the plurality of arbitrary facial expressions of the 3D mean-shape face model may be stored as expression templates. The virtual reality-based apparatus may be configured to detect a plurality of feature points from each color image of the received plurality of color images of the face of the first user based on a two dimensional (2D) facial landmark detection. The VR-based apparatus may be configured to estimate an affine transformation based on the detected plurality of feature points on the generated point cloud and a plurality of landmark points on the mean-shape face model. The VR-based apparatus may be configured to generate a rigid aligned point cloud by application of the estimated affine transformation to the generated point cloud.

In accordance with an embodiment, the VR-based apparatus may be configured to add a plurality of edges to the generated rigid aligned point cloud. The plurality of edges may be added based on connection of a plurality of points on the rigid aligned point cloud in accordance with adjacency of each point of the plurality of points on the rigid aligned point cloud in a 2D space. Further, the VR-based apparatus may be configured to derive an input mesh of face of the first user based on the addition of the plurality of edges to the rigid aligned point cloud.

In accordance with an embodiment, the VR-based apparatus may be configured to deform the pre-stored mean-shape face model based on the derived input mesh of the face of the first user. The VR-based apparatus may generate a deformed mean-shape face model based on the deformation of the pre-stored mean-shape face model.

The VR-based apparatus may estimate a weight for each shape component of the plurality of shape components that are stored in the memory device based on a minimum difference of vertices of each shape component with corresponding vertices of the rigid aligned point cloud. The VR-based apparatus may combine each weighted shape component of the plurality of weighted shape components from the stored 3D face model in the model-fitment to generate the first 3D face model of the face of the first user.

In accordance with an embodiment, the VR-based apparatus may be configured to evaluate a face model residue based on the difference of a plurality of vertices of the generated first 3D face model of the face of the first user and the generated rigid aligned point cloud of the face of the first user. The face model residue may comprise a plurality of sub-residues for the corresponding plurality of vertices of the first 3D face model of the face of the first user. The VR-based apparatus may be configured to apply a deformation to the evaluated face model residue to derive a deformed face model residue for the first 3D face model of the face of the first user. The VR-based apparatus may be configured to combine the deformed face model residue with the first 3D face model of the face of the first user to obtain the refined first 3D face model of the face of the first user. The applied deformation of the evaluated face model residue may be a Laplacian deformation.

In accordance with an embodiment, the VR-based apparatus may be configured to evaluate a set of transformations between the pre-stored mean-shape face model in the neutral expression and the pre-stored mean-shape face model in each of a plurality of arbitrary facial expressions stored in the memory device. The VR-based apparatus may be configured to apply the evaluated set of transformations on the refined first 3D face model of the first user in the neutral expression. Further, the VR-based apparatus may be configured to derive a set of blend shapes from the refined first 3D face model of the first user based on the applied set of transformations corresponding to the plurality of arbitrary facial expressions of the face of the first user. The VR-based apparatus may be configured to generate a second 3D face model of the face of the first user that corresponds to the captured facial expression of the first user based on the derived set of blend shapes.

FIG. 1 is a block diagram that illustrates an exemplary network environment to generate realistic 3D human face models, in accordance with an embodiment of the disclosure. With reference to FIG. 1, there is shown a network environment 100. The network environment 100 may include a Virtual Reality (VR)-based apparatus 102, a server 104, a sensing device 106, a communication network 108, and a first user 110. The sensing device 106 may further comprise an image sensor 106A and a depth sensor 106B. The first user 110 may be associated with the VR-based apparatus 102. The VR-based apparatus 102 may be communicatively coupled to the server 104, and the sensing device 106, via the communication network 108.

The VR-based apparatus 102 may comprise suitable logic, circuitry, interfaces, and/or code that may be configured to generate a 3D human face model. The 3D human face model may include a plurality of feature points such as eyes, eyebrows, nose, ears, and/or other similar features which defines a human face. The VR-based apparatus 102 may be configured to introduce (or add) the plurality of feature points and/or other features of a human face in real time or near-real time to the generated 3D face model. Examples of the VR-based apparatus 102 may include, but are not limited to, a computing device, a video-conferencing system, an augmented reality-based device, a gaming device, a mainframe machine, a server, a computer workstation, and/or a consumer electronic (CE) device.

The server 104 may comprise suitable circuitry, interfaces, and/or code that may be configured to store a 3D face model that is an existing 3D face model. The existing 3D face model may be a principle component analysis (PCA) model. The server 104 may be further configured to store a mean-shape face model in the neutral expression and a plurality of shape components of the mean-shape face model as a part of the stored 3D face model. The mean-shape face model and the plurality of shape components may be obtained from an existing model, such as the stored 3D face model that may be the PCA model. The mean-shape may be the mean of several faces, for example, 100-300 faces and the main components may be the principle components of the difference between all faces and the mean-shape. In some embodiments, the PCA face model may be trained based on scanning and registration of several faces, for example, 100-300 faces.

The server 104 may be configured to store a plurality of arbitrary facial expressions related to the mean-shape face model. The server 104 may be further configured to store the generated 3D face models of the face of the first user 110. Examples of the server 104 may include, but are not limited to, an application server, a cloud server, a web server, a database server, a file server, a gaming server, a mainframe server, or a combination thereof.

The sensing device 106 may comprise suitable logic, circuitry, interfaces, and/or code that may be configured to capture a plurality of color images and corresponding depth information of the face of the first user 110. The plurality of color images and corresponding depth information of the face may be captured from one or more viewing angles in a neutral facial expression. The sensing device 106 may be configured to capture one or more facial expression of the face of the first user 110 in real time, near-real time, or a certain lag time. The sensing device 106 may be further configured to determine appearance attributes of the face of the first user 110, based on a captured facial expression. The sensing device 106 may be configured to transmit the captured plurality of color images and corresponding depth information to the VR-based apparatus 102, via the communication network 108. The sensing device 106 may comprise a plurality of sensors, such as a combination of a depth sensor, a color sensor, (such as a red-green-blue (RGB) sensor), and/or an infrared (IR) sensor which may capture the user in a plurality of arbitrary facial expressions from different viewing angles. Examples of the sensing device 106 may include, but are not limited to, the depth sensor, the RGB sensor, the IR sensor, a 3D-mesh structure generator used to move an object, an image sensor, and/or a motion-detector device.

The communication network 108 may include a communication medium through which the VR-based apparatus 102 may be communicatively coupled to the server 104 and the sensing device 106. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

The first user 110 may refer to an object-of-interest whose realistic 3D face model is to be generated. The first user 110 may be a human or a robot that may resemble a real human. The first user 110 may be associated with the sensing device and/or VR-based apparatus 102.

In operation, the VR-based apparatus 102 may be configured to store a 3D face model that is an existing 3D face model. The stored 3D face model may be a Principle Component Analysis (PCA) model. The PCA model may be built from a plurality of different faces, for example, about 200 faces of different users. The PCA may identify and extract certain important uncorrelated data components from a large set of correlated data components. The VR-based apparatus 102 may further be configured to store a mean-shape face model in the neutral expression and a plurality of shape components of the mean-shape face model as a part of the stored 3D face model. The mean-shape face model may be mean of the plurality of different faces, for example, about 200 faces. The VR-based apparatus 102 may further be configured to store a plurality of arbitrary facial expressions related to the mean-shape face model. The first user 110 may be positioned in front of the sensing device 106. The sensing device 106 may be configured to capture a plurality of color images and corresponding depth information of the face of the first user 110 from different viewing angles in neutral expression. The image sensor 106A of the sensing device 106 may be configured to capture the color images of the face of the first user 110 sitting in front of the sensing device 106 in a neutral expression. The neutral expression of the face of the first user 110 may be characterized by neutral position of features of the face of the first user 110, which implies lack of strong emotion such as happy, sad, anger, or any other emotion. For example, eyebrows, lips, mouth, cheek or forehead muscles remain in original or neutral position, which implies lack of different emotions, such as happy, sad, anger, laughter, tensed, and the like. The depth sensor 106B may be configured to capture the corresponding depth information of the face of the first user 110 positioned in front of the sensing device 106 in a neutral expression at the time of capture of the color images. The captured depth information of the face of the first user 110 may include information about "Z" coordinates of the face of the first user 110. For example, an amount of protrusion, such as a mole, protuberance of a nose, depth of cheek region with respect to forehead region, and different depths of different regions of the face cannot be estimated with accuracy without depth information of each region of the face of the first user 110. The color images and the corresponding depth information may be aligned with each other such that the color images and the corresponding depth information of the face of the first user 110 may be captured together at a same time and may represent a same field-of-view. The alignment of the color images and corresponding depth information may be done by use of an alignment algorithm. Using only the color images provides two dimensional (2D) information of the face of the first user 110. In contrast, using a combination of both the depth information and corresponding color image details of the same field-of-view provides enhanced understanding of the shape, different facial features, and depth of each region of face from a three dimensional perspective retaining intricate details of the face of the first user 110. The VR-based apparatus 102 may be configured to receive the color images and corresponding depth information of the face of the first user captured by the sensing device 106, via the communication network 108.

The VR-based apparatus 102 may be configured to select one or more color images to place a bounding box over a face portion of the selected color image. The selected one or more color images represents an aggregate of color images representative of different viewing angles. The VR-based apparatus 102 may be configured to detect a plurality of feature points in the bounding box that includes the face portion, based on a 2D facial landmark detection. The VR-based apparatus 102 may be configured to generate a point cloud by projecting the points inside the bounding box to a 3D space, where the point cloud also includes 3D coordinates of the feature points, such as distinct points on eyes, nose, lips, and the like. The point cloud includes a set of data points usually in a 3D coordinate system defined by "X, Y, and Z" coordinates. The point cloud may be generated to represent the external surface of an object, such as the face portion of the first user 110 in this case. The point cloud may be generated with high accuracy and minimum noise using aggregate of the multiple color images of the face of the first user 110 from the sensing device 106 with corresponding depth information from different viewing angles in neutral expression. For example, a single image of the face of the first user 110 may not represent the face portion of the first user 110 accurately, in terms of color or positions of the components of the face portion. Therefore, aggregate of the multiple images of the face of the first user 110 may capture the actual face portion of the first user 110 accurately.

The VR-based apparatus 102 may further be configured to estimate an affine transformation between the 3D coordinates of the feature points on the point cloud and certain corresponding landmarks on the mean-shape face model. The landmarks correspond to distinct points on the mean-shape face model, such as eyes, nose, lips, and the like, similar to the feature points on the point cloud. The VR-based apparatus 102 may be configured to generate a rigid aligned point cloud by application of the estimated affine transformation to the generated point cloud. The VR-based apparatus 102 may be configured to execute a rigid alignment operation to align the plurality of feature points of the face of the first user 110. The plurality of feature points may consist of feature points such as eyes, nose, lips, eyebrows or other such feature points. An example of the rigid alignment is shown and further described, for example, in FIG. 3C

The VR-based apparatus 102 may further be configured to add a plurality of edges to the generated rigid aligned point cloud based on connection of a plurality of points on the rigid aligned point cloud in accordance with adjacency of each point of the plurality of points on the rigid aligned point cloud in a 2D space. The VR-based apparatus 102 may be configured to derive an input mesh of the face of the first user 110 based on the addition of edges to the rigid aligned point cloud of the face of the first user 110. Further, the VR-based apparatus 102 may be configured to deform the stored mean-shape face model in neutral expression based on the derived input mesh of the face of the first user 110 in neutral expression. The VR-based apparatus 102 may be configured to generate a deformed mean-shape face model based on the deformation of the stored mean-shape face model. The generated deformed mean-shape face model may resemble or look-alike the face of the first user 110. The VR-based apparatus 102 may be configured to calculate a correspondence by estimating the nearest points between the deformed mean-shape face model and the generated point cloud of the face of the first user 110. Each vertex on the mean-shape face model may be assigned a correspondence from the generated point cloud. An example of the derived input mesh and the deformed mean-shape face model of the face of the first user 110 is shown and described, for example, in FIG. 3D

The VR-based apparatus 102 may minimize the calculated correspondence to minimize the difference between the stored mean-shape face model and the generate point cloud. A human face model may represent human face as linear combination of different basic shape components. The coefficients of these different components may be optimized using a linear optimization. The VR-based apparatus 102 may be configured to estimate a weight for each shape component of the different basic shape components of the face of the first user 110 based on the calculated minimum correspondence. The VR-based apparatus 102 may be configured to combine each weighted shape component of the face of the first user 110 to generate a first 3D face model of the face of the first user 110. An example of the plurality of weighted shape components of the face of the first user 110 is shown and described, for example, in FIG. 3E.

The first 3D face model may be generated by fitting the stored 3D face model in neutral expression with the mean-shape face model using the generated point cloud, hence it does not contain a plurality of personal appearance attributes of the face of the first user 110 such as moles, wrinkles or some other personal appearance attributes. The VR-based apparatus 102 may be configured to evaluate a face model residue based on the difference in positions of a plurality of vertices of the generated first 3D face model of the face of the first user 110 and the generated rigid aligned point cloud of the face of the first user. The evaluated residue may comprise a plurality of sub-residues, for example, a first, second and third sub-residue for the corresponding plurality of vertices of the generated of the first 3D face model of the face of the first user 110. A first sub-residue may be a difference between the plurality of vertices of the generated first 3D face model and the corresponding plurality of vertices in the generated point cloud. A second sub-residue may be a difference between the plurality of feature points of the first 3D face model and the corresponding plurality of feature points of the generated point cloud. The first sub-residue may be used for minimizing the difference between the shape of the generated first 3D face model and the shape of face of the first user 110. The second sub-residue may be used for minimizing the difference between key facial features, such as eye, lips, cheek, mouth, of the generated first 3D face model and the actual facial features of the first user 110. A third sub-residue may be used for smoothing the generated first 3D face model. The VR-based apparatus 102 may be configured to apply a deformation to the evaluated face model residue to derive a deformed face model residue for the first 3D face model of the face of the first user 110. The deformation applied to the evaluated face model residue may be a Laplacian deformation. Further, the VR-based apparatus 102 may be configured to apply the derived face model residue to the first 3D face model of the face of the first user 110 to obtain a refined first 3D face model of the face of the first user. The obtained refined first 3D face model may be the 3D model of the face of the first user 110 in a neutral expression which mimics the feature points and the appearance attributes placed in a neutral position on the face of the first user 110. For example, the shape of the feature points and the overall appearance of the refined first 3D face model becomes similar to the feature points and the appearance of the actual face of the first user 110 but only for neutral expression (devoid of any particular emotion, such as laugher, anger, and the like). An example for the evaluation of the first and the second sub-residue is shown and described, for example, in FIGS. 3G and 3H respectively.

The VR-based apparatus 102 may be configured to control display of the refined first 3D face model of the face of the first user 110 on the VR-based apparatus 102 such that a plurality of appearance attributes on the refined first 3D face model exhibit a minimum deviation from the shape and appearance of the face of the first user 110 in the captured plurality of color images in the neutral expression. In some embodiments, the VR-based apparatus 102 may be configured to control display of the refined first 3D face model of the face of the first user 110 on a remote display device (not shown). Since, the refined first 3D face model exhibits minimum deviation from the shape and appearance of the face of the first user 110, the display of the refined first 3D face model is realistic in nature. The appearance attributes of the face of the first user 110 are visible clearly on a display screen of the VR-based apparatus 102. Further, more pixels may be allocated to the face portion of the refined first 3D face model during display control for enhanced and vivid visualization of the refined first 3D face model as compared to other parts of complete 3D model of the first user 110. Further, within the face portion, there may be some facial regions that are rich in features, such as lips, eyes, and forehead, which are more prominent when viewed on the display screen. Such facial regions that are rich in features may be allocated even higher number of pixels than the other regions of the face portion during display of the refined first 3D face model.

In accordance with an embodiment, the VR-based apparatus 102 may be configured to evaluate a set of transformations between the stored mean-shape face model in neutral expression and stored mean-shape face model in a plurality of arbitrary facial expressions. An example of the evaluation of the set of transformations between the stored mean-shape face model in neutral expression and an arbitrary expression is shown and described collectively in FIGS. 3I and 3J.

In accordance with an embodiment, the VR-based apparatus 102 may be configured to derive a set of blend shapes. The set of blend shapes may be derived by the application of the evaluated set of transformations on the refined first 3D face model of the face of the first user 110 in a neutral expression corresponding to the plurality of arbitrary facial expressions of the face of the first user 110. An example of the derivation of the set of blend shapes by the application of the evaluated set of transformations on the refined first 3D face model of the face of the first user 110 in a neutral expression is shown and described, for example, in FIG. 3K. The VR-based apparatus 102 may generate a plurality of second 3D face models of the face of the first user 110 in a plurality of arbitrary face expressions based on the evaluated set of blend shapes. An example of the generation of the second 3D face model of the face of the first user 110 in an arbitrary facial expression based on the derived set of blend shapes is shown and described, for example, in FIG. 3L. In accordance with an embodiment, the VR-based apparatus 102 may retrieve the refined first 3D face models stored in the server 104. In accordance with an embodiment, the functions or operations of the VR-based apparatus 102 may be implemented by the server 104, without deviation from the scope of the disclosure.

Figure 2:
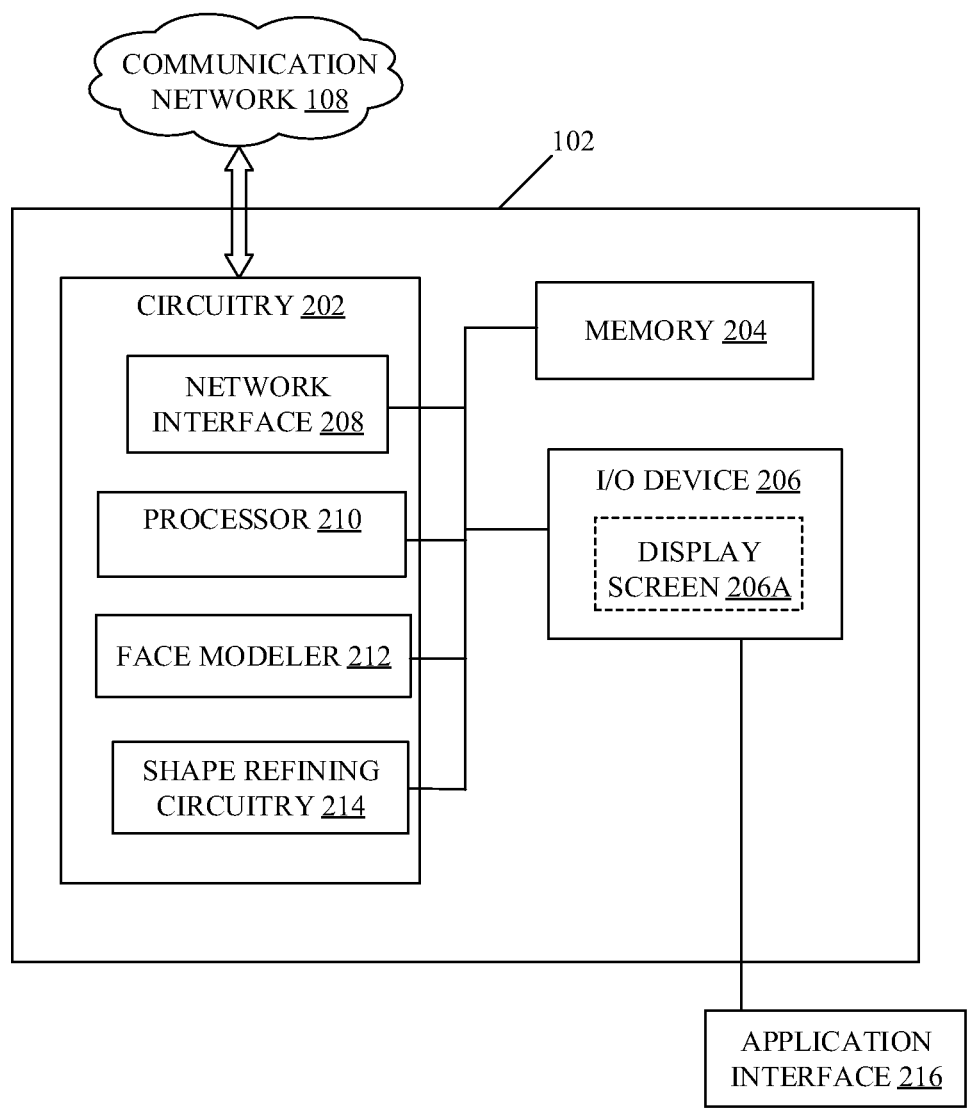
FIG. 2 is a block diagram that illustrates an exemplary virtual reality-based apparatus, in accordance with an embodiment of the disclosure.

FIG. 2 is a block diagram that illustrates an exemplary VR-based apparatus, in accordance with an embodiment of the disclosure. FIG. 2 is explained in conjunction with elements from FIG. 1. With reference to FIG. 2, there is shown the VR-based apparatus 102. The VR-based apparatus 102 may include a circuitry 202, a memory 204, and an input/output (I/O) device 206. The circuitry 202 may further include a network interface 208, a processor 210, a face modeler 212, and a shape refining circuitry 214. The I/O device 206 may include a display screen 206A, which may be utilized to render an application interface 216. The circuitry 202 which may include the network interface 208, the processor 210, the face modeler 212, and the shape refining circuitry 214 may be communicatively coupled to the memory 204 and the I/O device 206. The circuitry 202 may be configured to communicate with the server 104 and the sensing device 106, by use of the network interface 208.

The circuitry 202 may comprise suitable logic, circuitry, and/or interfaces that may be configured to execute the various operations involved in generating the 3D human face model. The circuitry 202 may be configured to generate a first 3D face model of the face of the first user 110 (e.g. actual human being) in real time or near-real time. The circuitry 202 may be configured to refine the shape of the generated first 3D face model of the face of the first user 110 to generate a refined first 3D face model. Further, the circuitry 202 may be configured to control the display of the refined first 3D face model of the face of the first user 110 on the VR-based apparatus 102 for VR applications. The circuitry 202 may be configured to execute the aforementioned operations, by the processor 210, face modeler 212 and the shape refining circuitry 214.

The memory 204 may comprise suitable logic, circuitry, and/or interfaces that may be configured to store a set of instructions executable by the circuitry 202. The memory 204 may be configured to store operating systems and associated applications. In accordance with an embodiment, the memory 204 may be further configured to store a 3D face model that is an existing 3D face model. The memory 204 may be further configured to store a mean-shape face model in the neutral expression and a plurality of shape components of the mean-shape face model as a part of the stored 3D face model. The memory 204 may be configured to store a plurality of arbitrary facial expressions related to the mean-shape face model. The memory 204 may be configured to store a plurality of generated 3D face models of the first user 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the first user 110. The I/O device 206 may be further configured to provide an output to the first user 110. The I/O device 206 may comprise various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may comprise suitable logic, circuitry, interfaces, and/or code that may be configured to render the application interface 216 to display 3D human face model. In accordance with an embodiment, the display screen 206A may be a touch screen, where input from the first user 110 may be received via the application interface 216. The display screen 206A may capture the input based on an input received from the first user 110. The first user 110 may be able to provide inputs with the help of a plurality of buttons or UI elements displayed on the touch screen. The touch screen may correspond to at least one of a resistive touch screen, a capacitive touch screen, or a thermal touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may comprise suitable logic, circuitry, interfaces, and/or code that may be configured to establish communication between the VR-based apparatus 102, the server 104, and the sensing device 106, via the communication network 108. The network interface 208 may be implemented by use of various known technologies to support wired or wireless communication of the VR-based apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The processor 210 may comprise suitable logic, circuitry, interfaces, and/or code that may be configured to execute a set of instructions stored in the memory 204. The processor 210 may be implemented based on a number of processor technologies known in the art. Examples of the processor 210 may be a Graphical Processing Unit (GPU), a Central Processing Unit (CPU), X86-based processor, a Reduced Instruction Set Computing (RISC) processor, an Application-Specific Integrated Circuit (ASIC) processor, a Complex Instruction Set Computing (CISC) processor, other processors, and/or a combination thereof.

The face modeler 212 may comprise suitable logic, circuitry, interfaces, and/or code that may be configured to generate the 3D face model of the first user 110. The face modeler 212 may be configured to align the mean-shape face model with the plurality of color images and corresponding depth information of the face of the first user 110, captured by the sensing device 106. Further, the face modeler 212 may be configured to generate blend shapes for a plurality of arbitrary expressions of the first user 110 based on the stored mean-shape face models in a plurality of arbitrary expressions. The face modeler 212 may be implemented as a separate processor or circuitry in the VR-based apparatus 102. The face modeler 212 and the processor 210 may be implemented as an integrated processor or a cluster of processors that perform the functions of the face modeler 212 and the processor 210. The face modeler 212 may be implemented as a set of instructions stored in the memory 204, which upon execution by the processor 210, may perform the functions and operations for the VR-based apparatus 102.

The shape refining circuitry 214 may comprise suitable logic, circuitry, interfaces, and/or code that may be configured to generate the 3D model of the face of the first user 110 which includes a plurality of appearance attributes of the face of the first user 110. The shape refining circuitry 214 may also be configured to refine the shape of the first 3D face model of the first user 110. The shape refining circuitry 214 may be implemented as a separate processor or circuitry in the VR-based apparatus 102. The shape refining circuitry 214 and the processor 210 may be implemented as an integrated processor or a cluster of processors that perform the functions of the shape refining circuitry 214 and the processor 210. The shape refining circuitry 214 may be implemented as a set of instructions stored in the memory 204, which upon execution by the processor 210, may perform the functions and operations for the VR-based apparatus 102.

The application interface 216 may correspond to a user interface (UI) rendered on a display screen, such as the display screen 206A. The application interface 216 may display the generated 3D face model of the first user 110. The 3D face model may be viewed from a plurality of view-points, by use of the application interface 216. An example of the application interface 216 may include, but is not limited to, a graphical user interface (GUI).

Figure 3A:
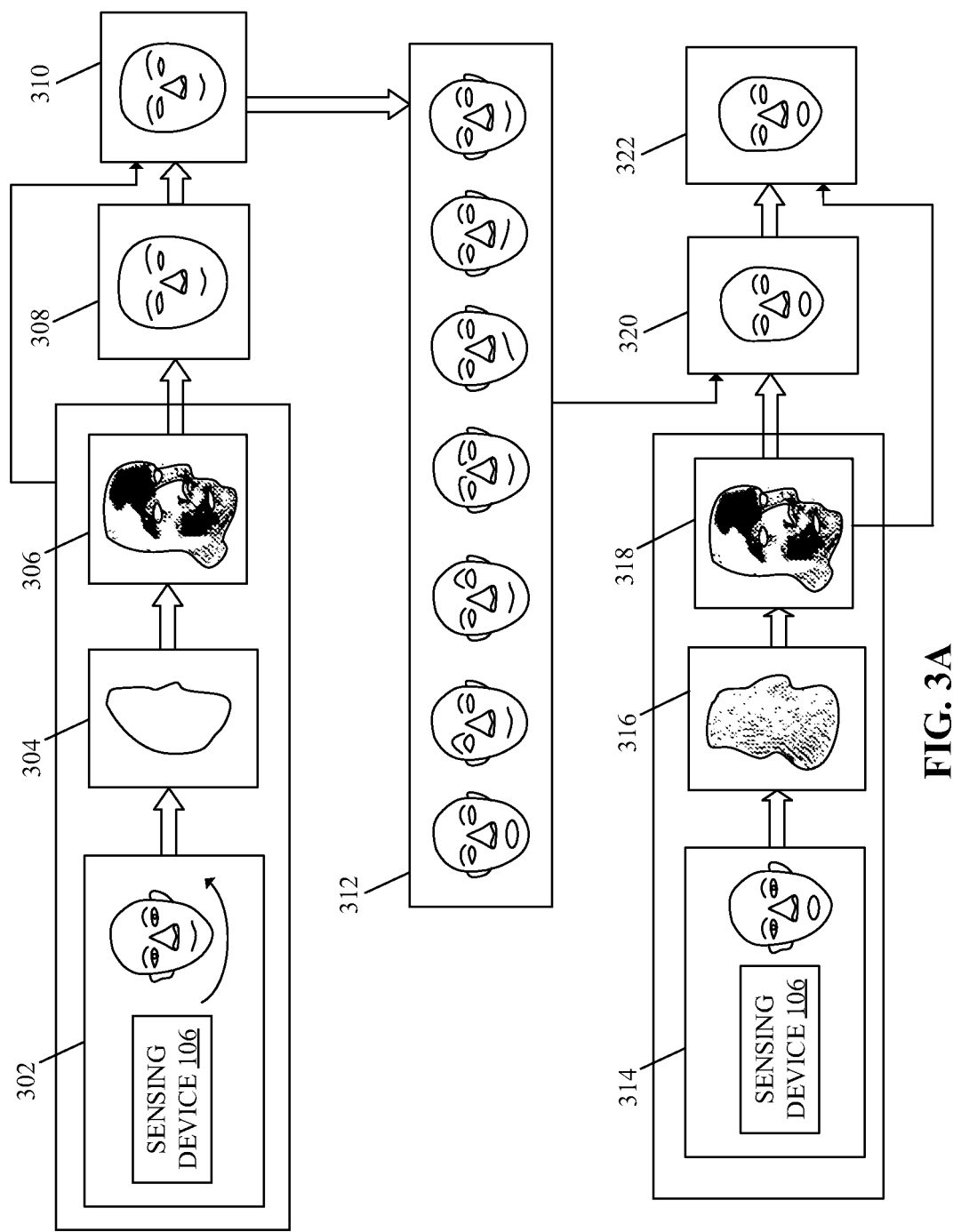
FIGS. 3A, 3B, 3C, 3D, 3E, 3F, 3G, 3H, 3I, 3J, 3K and 3L are diagrams that collectively illustrate exemplary generation of a 3D human face model using image and depth data, in accordance with an embodiment of the disclosure.

FIGS. 3A, 3B, 3C, 3D, 3E, 3F, 3G, 3H, 3I, 3J, 3K and 3L are diagrams that collectively illustrate the exemplary generation of a realistic 3D human face model, in accordance with an embodiment of the disclosure. FIGS. 3A, 3B, 3C, 3D, 3E, 3F, 3G, 3H, 3I, 3J, 3K and 3L are explained in conjunction with elements from FIG. 1 and FIG. 2. With reference to FIG. 3A, there is shown a processing pipeline to depict generation of a 3D human face model using operations 302 to 322.

At 302, the sensing device 106 may be configured to capture a plurality of color images and corresponding depth information of a face of the first user 110 for a neutral expression from different viewing angles. The sensing device 106 may be configured to capture the plurality of color images and corresponding depth information based on a request received from the VR-based apparatus 102.

At 304, the processor 210 may be configured to receive a plurality of color images and corresponding depth information of the face of the first user 110 from the sensing device 106, by use of the network interface 208. The plurality of color images and corresponding depth information may be received via the communication network 108. Thereafter, the face modeler 212 may be configured to generate a point cloud in real time or near-real time based on the received information from the sensing device 106. A point cloud is a set of data points, which is defined by "X, Y, and Z" coordinates in a 3D coordinate system. The point cloud may be generated to represent the external surface of at least the face portion of the first user 110 (i.e. a real human being).

At 306, the face modeler 212 may be configured to align the generated point cloud with the stored mean-shape face model. The face modeler 212 may be configured to align a plurality of feature points of the face of the first user 110 such as the eyes, nose, lips, and/or other feature points, with the stored mean-shape face model to generate the rigid aligned point cloud. In the non-rigid alignment operation, the face modeler 212 may be configured to align all the points of the face of the first user 110 with the stored mean-shape face model. The face modeler 212 may be configured to generate a deformed mean-shape face model in a neutral expression after applying rigid and non-rigid alignment operation on the stored mean-shape face model.

At 308, the face modeler 212 may be configured to fit the stored 3D face model with the mean-shape face model using the generated point cloud. The stored 3D face model represents the face of the first user 110 as a linear combination of different basic shape components. In the model fitting operation, the face modeler 212 may be configured to estimate the weights of the different basic shape components of the stored 3D face model.

At 310, the shape refining circuitry 214 may be configured to refine the shape of the first 3D face model of the face of the first user 110. The shape refining circuitry 214 may be configured to include user-specific appearance attributes to the first 3D face model of the face of the first user 110. The shape refining circuitry 214 may be configured to generate the refined first 3D face model of the face of the first user 110. In conventional systems, because of the shortage of the Z-coordinates (depth information) of the input data and the small number of correspondence used to fit a 3D-model, the reconstructed 3D-model is usually not accurate enough. The disclosed method utilizes depth information for the 3D-model fitting and correspondence is calculated for all the vertices on the first 3D face model, followed by refinement by the shape refining circuitry 214 which highly improves the accuracy of the 3D-face modeling.

At 312, the face modeler 212 may be configured to generate a set of blend shapes for different arbitrary expressions of the face of the first user 110 based on the pre-stored plurality of arbitrary facial expressions of the 3D mean-shape face model.

At 314, the sensing device 106 may be configured to capture one or more color images and corresponding depth information of the face of the first user 110 in an arbitrary expression, from one or more viewing angles. The sensing device 106 may be configured to capture one or more color images and corresponding depth information based on a request received from the VR-based apparatus 102, as done in 302.

At 316, the processor 210 may be further configured to receive one or more color images and corresponding depth information of the face of the first user 110 in an arbitrary expression (e.g. other than neutral expression) from the sensing device 106, via the communication network 108. The face modeler 212 may be configured to generate a point cloud for the face of the first user 110 in an arbitrary expression based on the received information from the sensing device 106, as done in 304. Examples of the arbitrary expression may include, but are not limited to sad, anger, open mouth, deformed cheeks, raised eyebrows, or any arbitrary facial expressions by the first user 110.

At 318, the face modeler 212 may be configured to align the generated point cloud, for an arbitrary expression, with the refined first 3D face model of the face of the first user 110 in neutral expression, as processed in 306. The face modeler 212 may be configured to align a plurality of feature points of the face of the first user 110 such as the eyes, nose, lips, and/or other feature points, with the refined first 3D face model of the face of the first user 110 in neutral expression and generate a rigid aligned point cloud. In the non-rigid alignment operation, the face modeler 212 may be configured to align all the points of the face of the first user 110 with the stored mean-shape face model. The face modeler 212 may be configured to generate a deformed mean-shape face model in an arbitrary expression after applying rigid and non-rigid alignment operation on the stored mean-shape face model.

At 320, the face modeler 212 may be configured to fit the generated point cloud of the first user 110 in arbitrary expression and generate a second 3D face model of the face of the first user 110 in an arbitrary expression. In the model fitting operation, the face modeler 212 may be configured to estimate the coefficients for different blend shapes for different arbitrary facial expressions of the face of the first user 110. In conventional systems, typically, the generation of blend shapes which are also used to construct the 3D face model with expressions involves asking the character or an actual user to make different basic expressions in front of a camera and use the reconstructed 3D-model of different basic expressions as the blend shapes. Such conventional systems and methods involve too much involvement of the actual user, such as the first user 110, who may not always provide good, consistent, or readily-usable basic expressions leading to poor results. The disclosed system omits such involvement of actual user since the blend shapes are generated automatically according to available reference templates of expressions, as described.

At 322, the shape refining circuitry 214 may be configured to refine the shape of the second 3D face model of the face of the first user 110 in an arbitrary expression. The shape refining circuitry 214 may be configured to include the user specific appearance attributes to the first 3D face model of the face of the first user 110 in an arbitrary expression. The shape refining circuitry may be configured to generate the refined first 3D face model of the face of the first user 110 in an arbitrary expression.

Figure 3B:
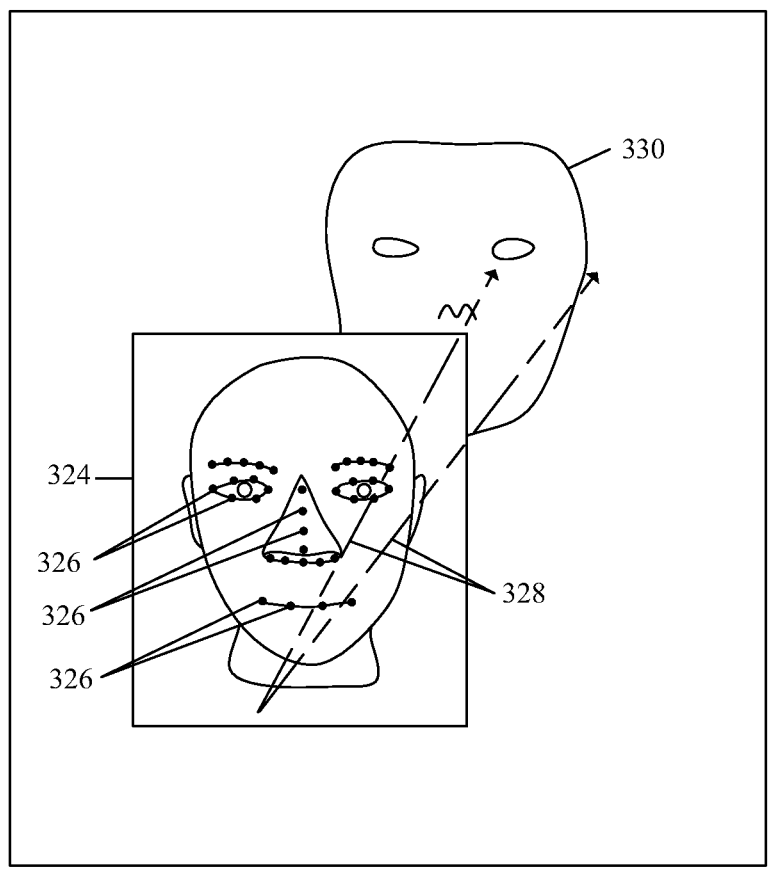

FIG. 3B illustrates generation of a point cloud for 3D human face model of the first user 110, in accordance with an embodiment of the disclosure. With reference to FIG. 3B, there is shown an aggregate (referred to as an aggregate color image 324) of a plurality of color images, a plurality of feature points 326, a projection 328 of the plurality of feature points and a point cloud 330. In FIG. 3B, the operation 304 of FIG. 3A that is related to the generation of a point cloud for 3D human face model of the first user 110 in neutral expression and the operation 316 of FIG. 3A that is related to the generation of a point cloud for 3D human face model of the first user 110 in arbitrary expression in the processing pipeline of FIG. 3A, is further described in details.

The face modeler 212 may be configured to generate the point cloud 330 for the 3D human face model of the first user 110 based on the aggregate color image 324 of the plurality of color images and corresponding depth information of the face of the first user 110 received from the sensing device 106, via the communication network 108. The face modeler 212 may be configured to place the bounding box on the aggregate color image 324 received by the sensing device 106. Further, the face modeler 212 may be configured to project the plurality of feature points 326 placed inside the bounding box to a 3D space as shown in the projection 328. The plurality of feature points 326 may include key feature points of the face of the first user 110, such as eyes, nose, lips, ears and/or other feature points which are essential for defining any human face.

In accordance with an embodiment, the face modeler 212 may be configured to detect the plurality of feature points 326 of the face of the first user 110 using a 2D facial landmarks detector. The projection 328 of the plurality of feature points 326 from 2D to 3D generates the point cloud 330 for the 3D human face model. The point cloud 330 refers to a set of data points in a 3D coordinate system which represents the external surface of the face of the first user 110. The face modeler 212 may further be configured to aggregate (e.g. the aggregate color image 324) a plurality of color images and their corresponding depth information of the face of the first user 110, captured by the sensing device 106, to generate the point cloud 330 with minimum noise and high accuracy.

Figure 3C:
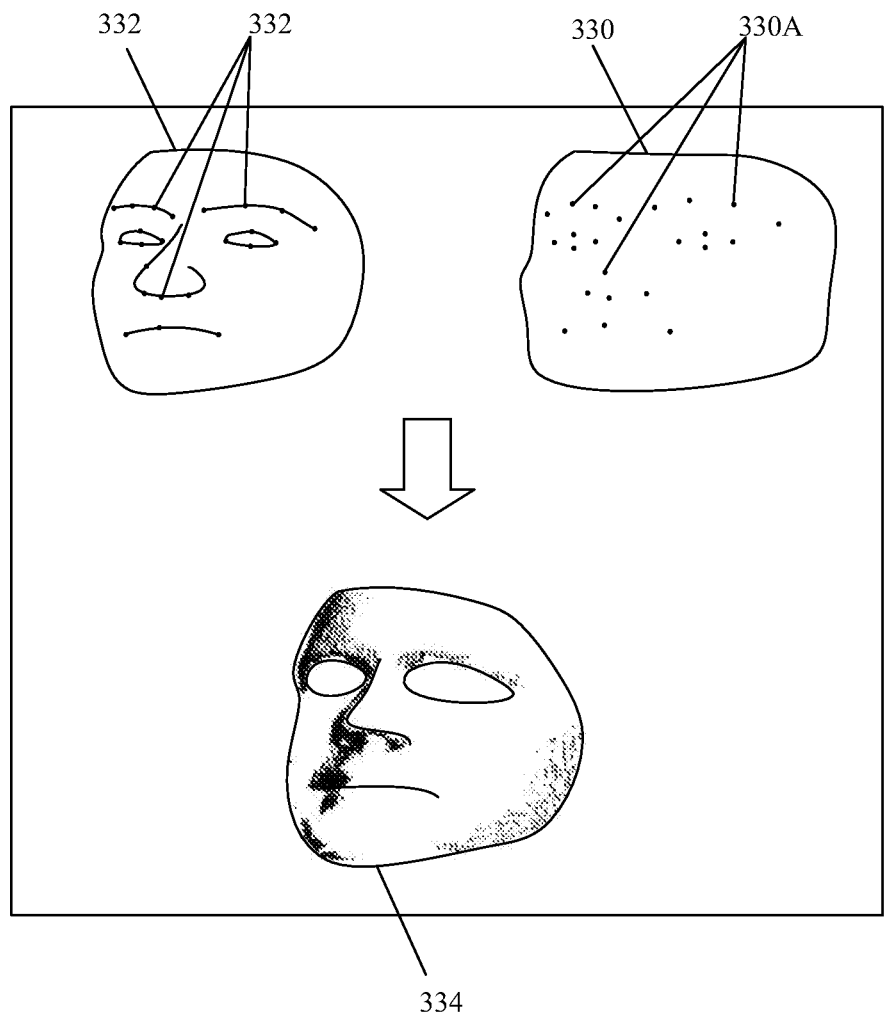

FIG. 3C illustrates rigid alignment of the point cloud 330 with respect to the stored mean-shape face model 332. In FIG. 3C, the operation 306 of FIG. 3A that is related to the alignment of generated point cloud for 3D human face model of the first user 110 in the processing pipeline of FIG. 3A, is further described.

The face modeler 212 may be configured to estimate an affine transformation between the 3D coordinates of the feature points 330A on the point cloud 330 and the landmarks 332A on the mean-shape face model 332 in neutral expression. Affine transformation refers to a function which preserves points, straight lines, and planes. In accordance with an embodiment, the affine transformation may be estimated to align the feature points of the point cloud 330 of the face of the first user 110 with the mean-shape face model 332. The face modeler 212 may be configured to estimate the affine transformation to align the feature points 330A of the face of the first user 110 such as the eyes, nose, lips, cheeks, or other feature points. The estimated affine transformation is applied on the point cloud 330 extracted from the bounding box, known as the extracted point cloud, to obtain the rigid aligned point cloud 334. The affine transformation may be estimated by equation (1) as shown below:

$$\begin{bmatrix} f'x \\ f'y \\ f'z \end{bmatrix} = R \begin{bmatrix} fx \\ fy \\ fz \end{bmatrix} + t \quad (1)$$

Where, f represents the feature points 330A of the point cloud 330;
f' represents the landmarks 332A of the mean-shape face model 332;
The affine transformation may be applied on the extracted point cloud by equation (2) as shown below:

$$\tilde{v} = Rv + t \quad (2)$$

where, "v" represents the point cloud 330;
"$\tilde{v}$" represents the rigid aligned point cloud 334; and
"R" and "t" represents the rotation and translation applied on the point cloud 330.

Figure 3D:
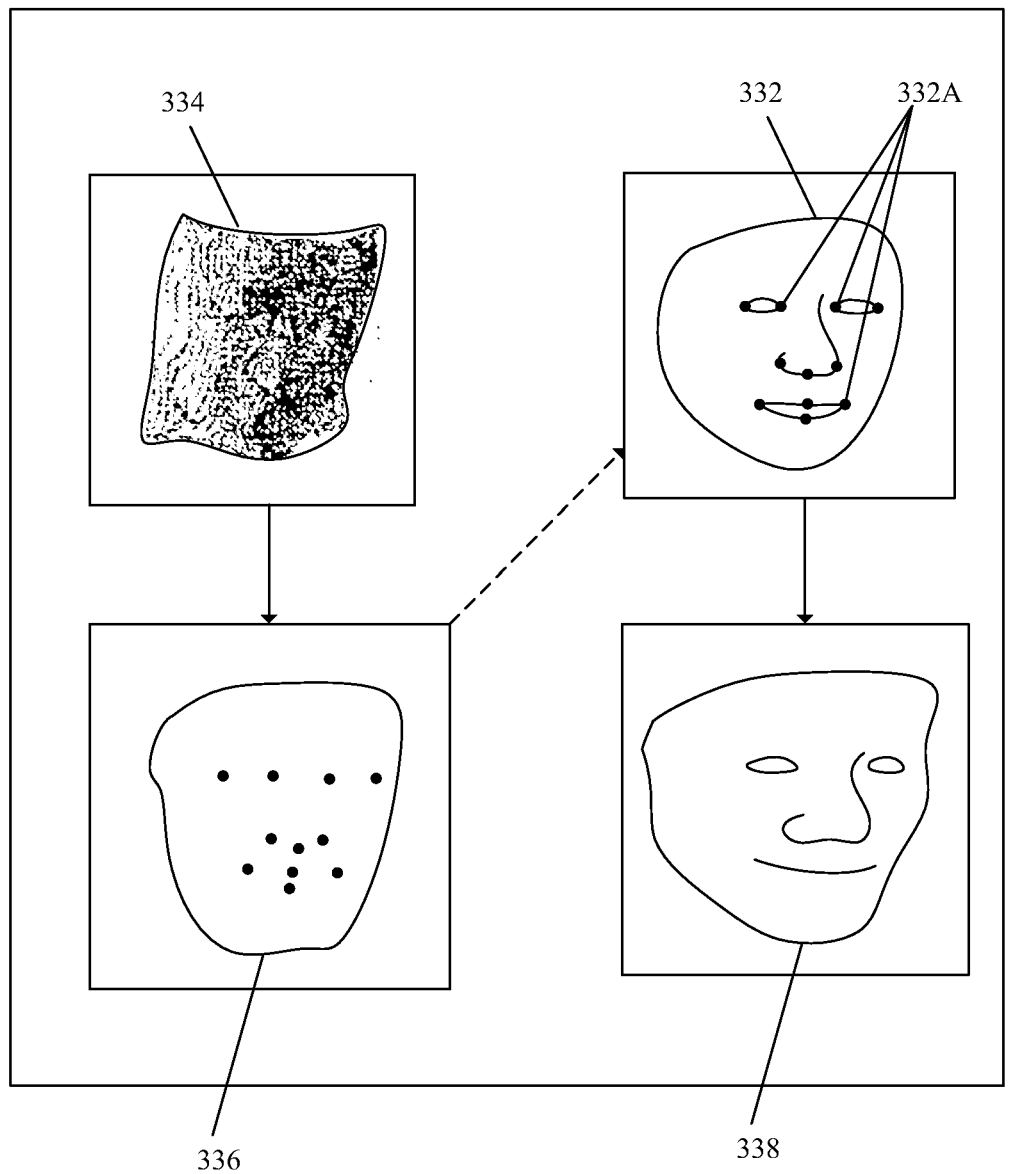

FIG. 3D illustrates non-rigid alignment of the rigid aligned point cloud 334 (of FIG. 3C) with the mean-shape face model 332. With reference to FIG. 3D, there is further shown an input mesh 336 and a deformed mean-shape face model 338. In FIG. 3D, the operation 306 of FIG. 3A that is related to the alignment of generated point cloud for 3D human face model of the first user 110 in the processing pipeline of FIG. 3A, is further described in details.

The face modeler 212 may be configured to connect the points and form the edges on the rigid aligned point cloud 334 to obtain the input mesh 336. The face modeler 212 may be configured to deform the mean-shape face model 332 with respect to the input mesh 336 to generate the deformed mean-shape face model 338, as shown. In accordance with an embodiment, the face modeler 212 may be configured to calculate correspondence based on the estimation of nearest points between the deformed mean-shape face model 338 and the rigid aligned point cloud 334. The deformation may be performed by use of the equation (3), as shown below:

$$\min_{\tilde{v}_1,\ldots,\tilde{v}_n} E(v_1\ldots v_n, c_1\ldots c_n) = w_s E_s + w_1 E_1 + w_c E_c \quad (3)$$

Subject to $\tilde{v}_{s_k} = m_k$, $k \in 1 \ldots m$ where, $v_i$ represents the deformed vertices of the mean-shape face model 332;

$c_i$ represents the corresponding vertices of the input mesh 336;

$E_s = \Sigma_{i=1}^{|T|} \Sigma_{j \in adj(i)} \|T_i - T_j\|_F^2$ represents the deformation smoothness;

$E_I = \Sigma_{i=1}^{|T|} \|T_i - T_j\|_F^2$ represents the deformation identity;

$E_c = \Sigma_{i=1}^{|n|} \|v_i - c_i\|_F^2$ represents the closest valid point;

$T_i$ represents Affine transformation for one triangle;

$w_s$, $w_I$, $w_c$ represents weights of $E_s$, $E_I$, $E_c$ respectively;

$s_k$ represents the source vertex index for marker k; and $m_k$ represents the position of marker k on input mesh 336.

Figure 3E:
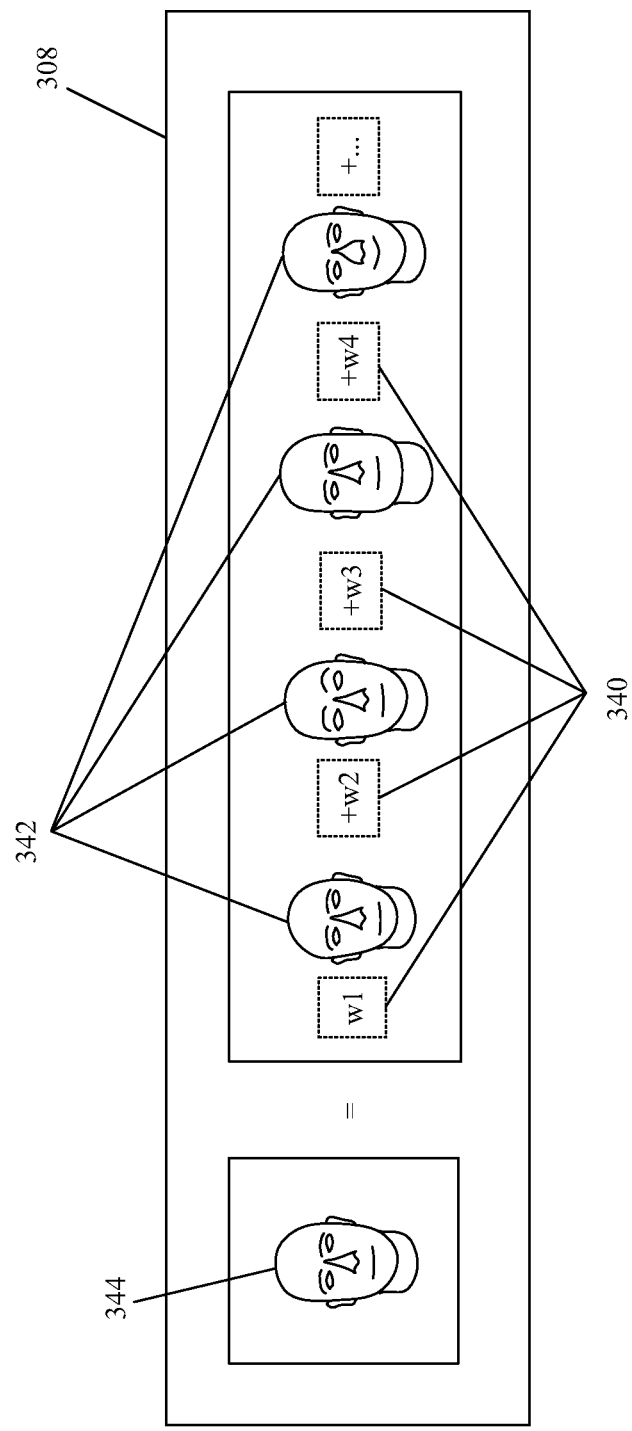
Figure 3F:
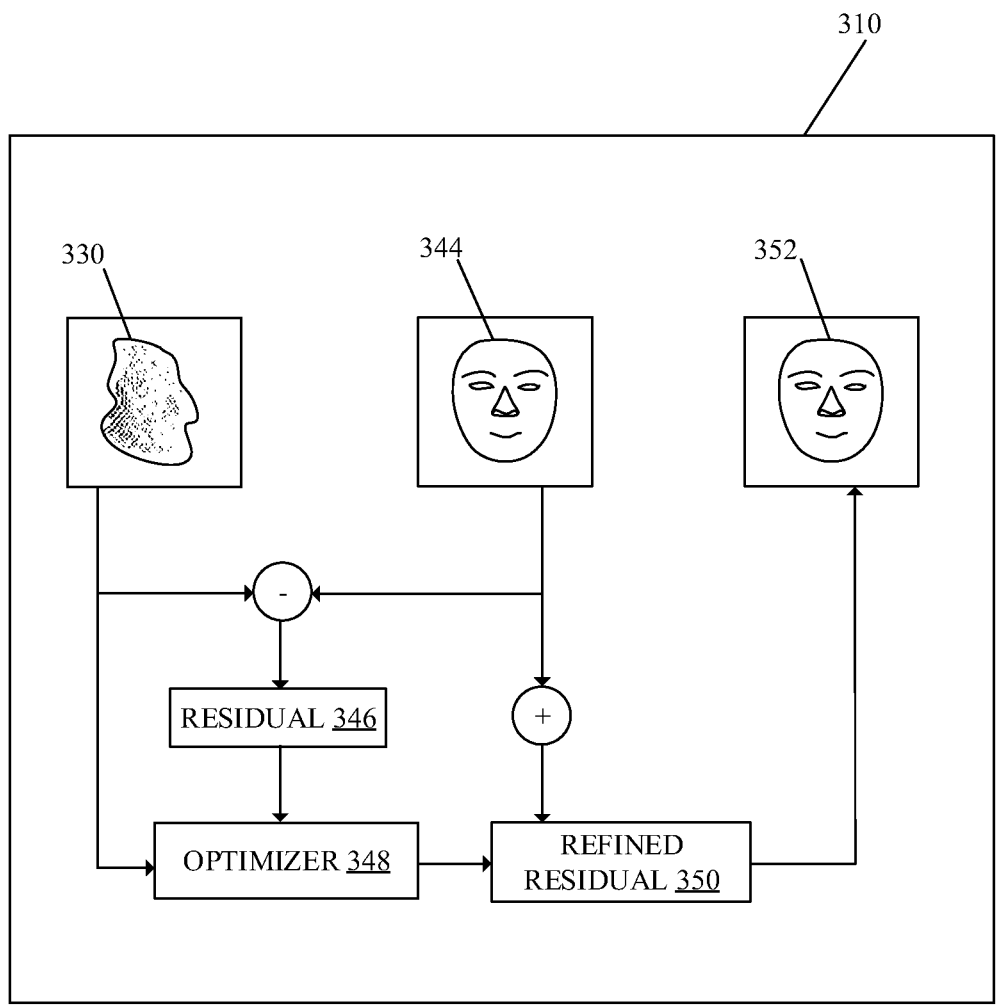

FIG. 3E illustrates model fitting operation to generate a 3D human face model in the processing pipeline of FIG. 3A. With reference to FIG. 3F, there is shown a first 3D face model 344 and weight coefficients 340 for different shape components 342. In FIG. 3E, the model fitting operation (i.e. operation 308 of FIG. 3A) that is related to the refinement of the shape of the first 3D face model 344 of the face of the first user 110 in the processing pipeline of FIG. 3A, is further described in details.

The first 3D face model 344 of the face of the first user 110 may be the 3D face model of the first user 110 which may not include a plurality appearance attributes of the face of the first user 110. The appearance attributes may include moles, wrinkles or other attributes present on the outer surface of the face of the first user 110. The different shape components 342 refers to a plurality of different components of the human face such as, the eyes, nose, lips, cheeks, forehead and the like. The shape of these basic components of the human face leads to a particular shape of the human face. The weight coefficients 340 refers to the weight assigned to each of these shape components 342 to generate the target first 3D face model of the face of the first user 110.

The face modeler 212 may be configured to minimize the correspondence of each vertex on the first 3D face model 344 from the point cloud 330. A linear face model may represent the face as a linear combination of different shape components 342. The face modeler 212 may be configured to estimate the weight coefficients 340 for different shape components 342, and generate the first 3D face model 344 for the face of the first user 110 in a neutral expression. The first 3D face model 344 of the face of the first user 110 may be generated by the equation (4) as shown below, $$F = \mu + U\Sigma_u \alpha \quad (4),$$

where F represents the first 3D face model 344;
$\mu$ represents the average shape of the face of the first user 110;
U represents an orthonormal basis, where orthonormal basis refers to a basis for a vector space whose vectors are all unit vectors and orthogonal to each other;
$\Sigma_u$ represents the eigenvalues, where eigenvalues refers to each of a set of values of a parameter for which a differential equation has a non-zero solution under given conditions;
$\alpha$ represents the coefficients;
The value of the coefficients of the different shape components 342 may be calculated by the equation (5) as shown below, $$\min_{\alpha} \sum_{i=1}^{n} \|v_i - F_i\|^2 + w \sum_{j=1}^{m} \|v_j - F_j\|^2 \quad (5)$$

where $v_i$, $F_i$ represents vertex on the model and its correspondence from the point cloud (n);

$v_j$, $F_j$ represents landmarks on the model and its correspondence from the point cloud (m);
w represents weights for the landmarks.

FIG. 3F illustrates the shape refinement to generate 3D human face model. With reference to FIG. 3F, there is shown the point cloud 330, the first 3D face model 344, a residual 346, an optimizer 348, refined residual 350, and a refined first 3D face model 352. In FIG. 3F, the shape refinement operation (i.e. operation 310 of FIG. 3A) that is related to the refinement of the shape of the first 3D face model 344 of the face of the first user 110 in the processing pipeline of FIG. 3A, is further described in details.

The shape refining circuitry 214 may be configured to include or add a plurality of appearance attributes of the face of the first user 110 in the first 3D face model 344 of the face of the first user 110. The shape refining circuitry 214 may be configured to calculate the residual 346 between the first 3D face model 344 and the point cloud 330. The residual 346 may be the difference between the first 3D face model 344 and the point cloud 330. The optimizer 348 may be configured to optimize the calculated residual 346 and obtain a refined residual 350. The optimizer 348 may apply Laplacian deformation to optimize the residual 346. Further, the shape refining circuitry 214 may be configured to add the refined residual 350 to the first 3D face model 344 and generate the refined first 3D face model 352. The shape refining circuitry 214 may execute the shape refinement operation by using equation (6) as shown below:

$$v^2 = v^1 + \Delta v \quad (6)$$

where, $v^2$ represents refined first 3D face model 352;
$v^1$ represents first 3D face model 344; and
$\Delta v$ represents optimized residual.

The optimizer 348 may optimize the residual by using the equation (7) as shown below:

$$\min_{\Delta v_i, \ldots, \Delta v_n} \sum_{i=1}^{n} (c_i^p(\Delta v_i) + w_1 c_i^w(\Delta v_i)) + w_2 C^L(\Delta v_i) \quad (7)$$

where, $c_i^p(\Delta v_i) = \|\Delta v_i - (p_i - v_i)\|_2^2$ (8), where $p_i$ represents the vertices of the input mesh 336 and $v_i$ represents the vertices of the first 3D face model 344;
$c_j^w(\Delta v_j) = \|P\Delta v_j - (u_j - v'_j)\|_2^2$ (9), where $u_j$ represents the points of the detected 2D features of the face of the first user 110, $v'_j$ represents the points of the projected 3D features of the face of the first user 110 and P represents the projection matrix;
$C^L = L(m)\Delta v$, represents the Laplacian smoothing term where L(m) represents the weights assigned for each of the vertices based on its smoothness among its neighborhood.
The face modeler 212 may utilize the equation (8) to fit all the vertices of the input mesh 336 to the corresponding vertices of the first 3D face model 344. Further, the face modeler 212 may also utilize the equation (9) to fit the points of the detected 2D features of the face of the first user 110, to the points of projected 3D features of the first 3D face model 344 of the face of the first user 110.

Figure 3G:
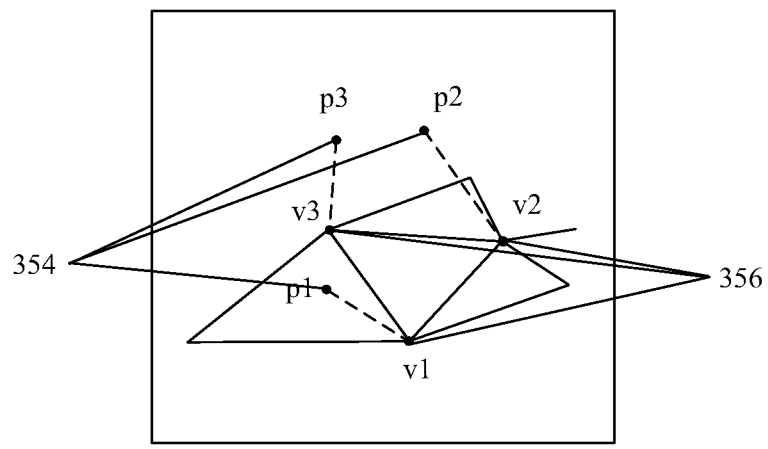

FIG. 3G illustrates the operation of fitting every vertex of the first 3D face model 344 of the face of the first user 110 to its correspondence in input mesh 336. With reference to FIG. 3G, there is shown a plurality of vertices 354 of the input mesh 336 and a plurality of vertices 356 of the first 3D face model of the face of the first user 110.

The shape refining circuitry 214 may be configured to fit all the vertices 356 of the first 3D face model 344 of the face of the first user 110 to its corresponding vertices 354 of the input mesh 336. For example, as shown in FIG. 3G, the vertices v1, v2 and v3 of the first 3D face model 344 of the face of the first user 110 are fitted to the corresponding vertices p1, p2 and p3 of the input mesh 336. The shape refining circuitry 214 may be configured to utilize the equation (8) to fit all the vertices 356 of the first 3D face model 344 of the face of the first user 110 to its corresponding vertices 354 of the input mesh 336.

Figure 3H:
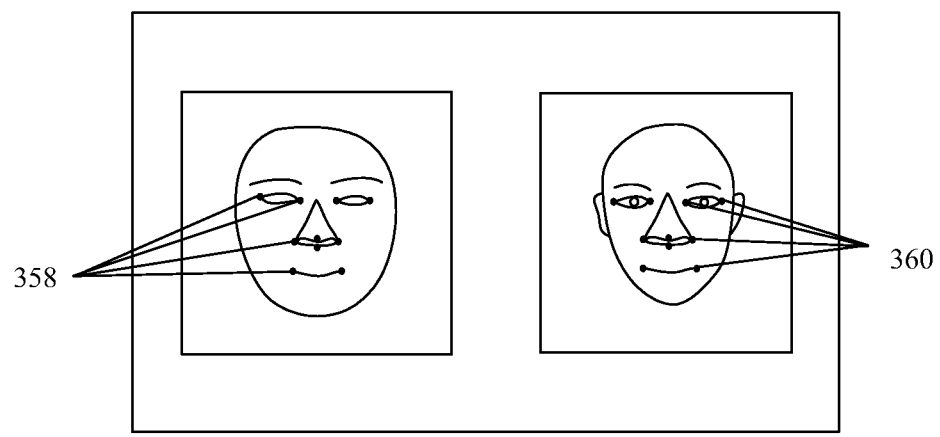

FIG. 3H illustrates the operation of fitting the points 358 of the detected 2D features of the face of the first user 110, to the points 360 of projected 3D features of the first 3D face model 344 of the face of the first user 110. With reference to FIG. 3H, there is shown a plurality of points 358 of the detected 2D features of the face of the first user 110 and a plurality of points 360 of the projected 3D features of the first 3D face model 344 of the face of the first user 110. The shape refining circuitry 214 may be configured to utilize the equation (9) for fitting the points 358 of the detected 2D features of the face of the first user 110, to the points 360 of projected 3D features of the first 3D face model 344 of the face of the first user 110.

The refined first 3D face model 352 of the face of the first user 110 may include the facial attributes of the captured face portion of the face of the first user 110. The refined first 3D face model 352 resembles an actual face of the first user 110 accurately and realistically. The facial attributes of the face of the first user 110 may include moles, wrinkles and the like, present on the face of the first user 110. The refined first 3D face model represents the face of the first user 110 in neutral expression.

Figure 3I:
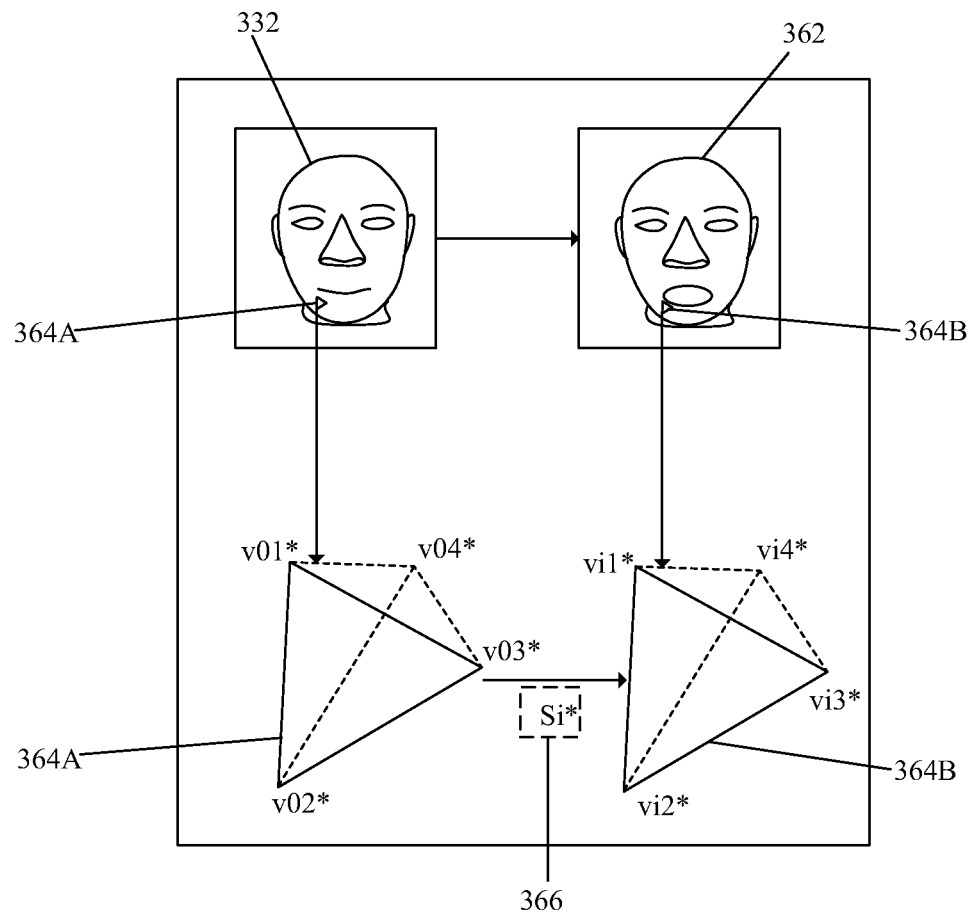
Figure 3J:
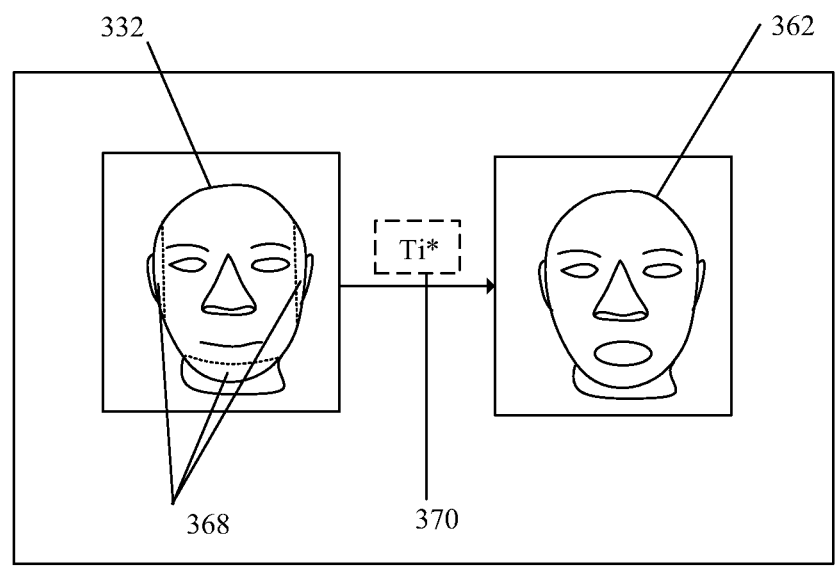
Figure 3K:
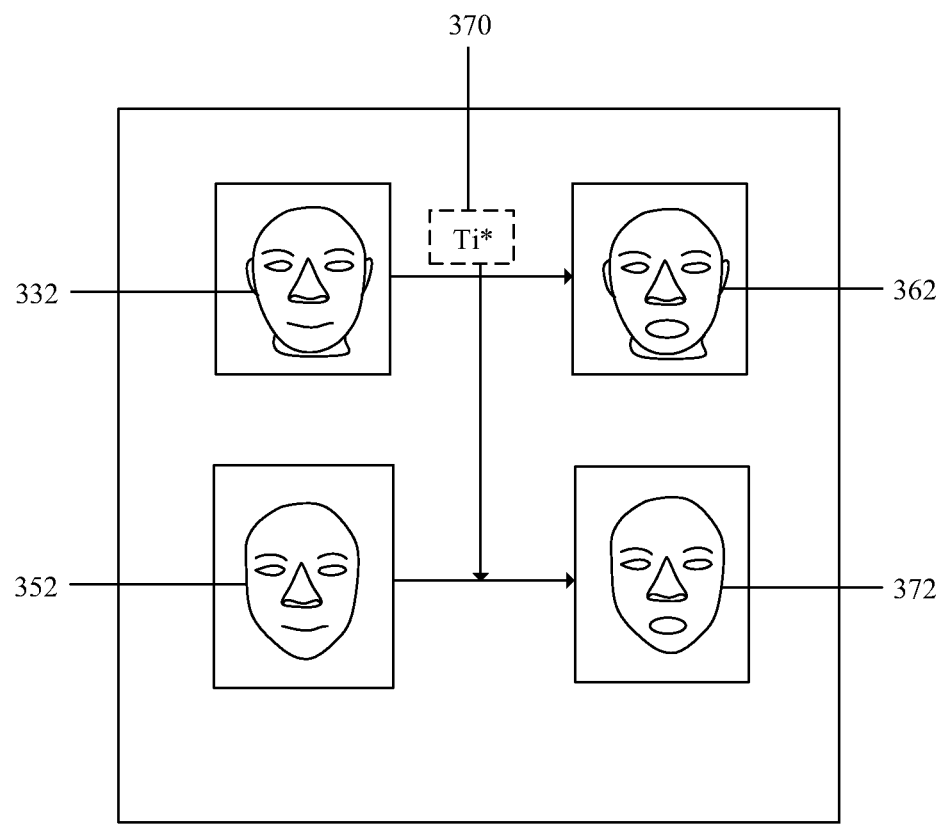

In FIGS. 3I, 3J and 3K collectively, the operations of generation of blend shapes (i.e. operation 312 of FIG. 3A) that is related to the generation of 3D face model of the first user 110 in an arbitrary facial expression of the face of the first user 110 in the processing pipeline of FIG. 3A, is further described in details.

FIG. 3I illustrates the operation to generate a 3D face model with a particular arbitrary expression for the face of the first user 110. With reference to FIG. 3I, there is shown the mean-shape face model 332 in neutral expression and the mean-shape face model in a stored arbitrary facial expression 362. Further, there is shown a triangle 364A of the mean-shape face model 332 in neutral expression, a triangle 364B of the mean-shape face model in a stored arbitrary facial expression 362 and a first transformation 366 estimated between the neutral expression and the arbitrary expression.

The face modeler 212 may be configured to calculate the first transformation 366 between the mean-shape face model 332 in neutral expression and the mean-shape face model in a stored arbitrary facial expression 362 from the stored plurality of arbitrary facial expressions of the stored 3D face model. The plurality of arbitrary facial expressions may correspond to facial expressions of the first user 110 such as sad, laugh, wide mouth, raised eyebrows, and the like. The face modeler 212 may be configured to calculate the transformation between each triangle 364A of the mean-shape face model 332 in neutral expression and each triangle 364B of the mean-shape face model in arbitrary facial expression 362. The triangles on the 3D face model (for e.g. the mean-shape face model 332 in neutral expression or the mean-shape face model in a stored arbitrary facial expression 362) may be formed by connecting the nearest three vertices on the 3D face model as shown in FIG. 3I that may be fixed for all the 3D face models. For example, as shown in FIG. 3I, a first transformation Si* is calculated between a tetrahedron formed by vertices v01*, v02*, v03* of the triangle 364A and an imaginary vertex v04* at the center of the triangle 364A of the mean-shape face model 332 and the corresponding tetrahedron formed by vertices vi1*, vi2*, vi3* and an imaginary vertex vi4* at the center of the triangle 364B of the mean-shape face model in stored arbitrary facial expression 362.

FIG. 3J illustrates the operation to generate a 3D face model with a particular arbitrary facial expression for the face of the first user 110 in continuation with FIG. 3I. With reference to FIG. 3J, there is shown the mean-shape face model 332 in neutral expression, the mean-shape face model in a stored arbitrary facial expression 362, a plurality of unmoved vertices 368 of the mean-shape face model 332 and a total transformation 370.

The face modeler 212 may be configured to calculate a transformation between the plurality of unmoved vertices 368 of the mean-shape face model 332 and the mean-shape face model in a stored arbitrary facial expression 362. The plurality of unmoved vertices 368 may consist of the vertices which do not change even when the expression is changed from neutral expression to any arbitrary facial expression. The arbitrary facial expression 362 may be any of the plurality of arbitrary facial expressions such as sad, laugh, anger, wide mouth, raised eyebrows, and the like. The total transformation 370 may be a combination of the calculated first transformation 366 and the transformation between the plurality of unmoved vertices 368. The face modeler 212 may be configured to calculate the total transformation 370 for a desired arbitrary facial expression from the plurality of pre-stored facial expressions. For example, as shown in FIG. 3J, the total transformation 370 (also represented by Ti*) may be calculated between the mean-shape face model 332 in neutral expression and the mean-shape face model in the arbitrary facial expression 362.

FIG. 3K illustrates the application of the calculated total transformation 370 on the generated refined first 3D face model 352 of the face of the first user 110 in neutral expression. With reference to FIG. 3K, there is shown the calculated total transformation 370 between the mean-shape face model 332 in neutral expression and the mean-shape face model in an arbitrary facial expression 362. There is also shown application of the calculated total transformation 370 on the refined first 3D face model 352 of the first user 110 in neutral expression to generate a 3D face model 372 of the face of the first user 110 in an arbitrary facial expression.

The face modeler 212 may be configured to derive a set of blend shapes by the application of the calculated set of transformations (or the calculated total transformation 370) on the refined first 3D face model of the face of the first user 110 in a neutral expression. The set of blend shapes corresponds to the plurality of arbitrary facial expressions of the face of the first user 110. For example, as shown in FIG. 3K, a 3D face model 372 of the face of the first user is generated by the application of the calculated total transformation 370 in the facial expression to the refined first 3D face model 352 of the face of the first user 110 in neutral expression.

To generate the 3D face model of the face of the first user 110 in arbitrary facial expression, the operations 314 to 318 of the processing pipeline as shown in FIG. 3A are executed. The sensing device 106 may be configured to capture one or more color images and corresponding depth information of the face of the first user 110 in arbitrary expression, from one or more viewing angles. The face modeler 212 may be configured to generate a point cloud for arbitrary expression based on the captured color image. The face modeler 212 may be configured to align the generated point cloud for arbitrary expression with the refined first 3D face model 352 of the face of the first user 110 in neutral expression.

Figure 3L:
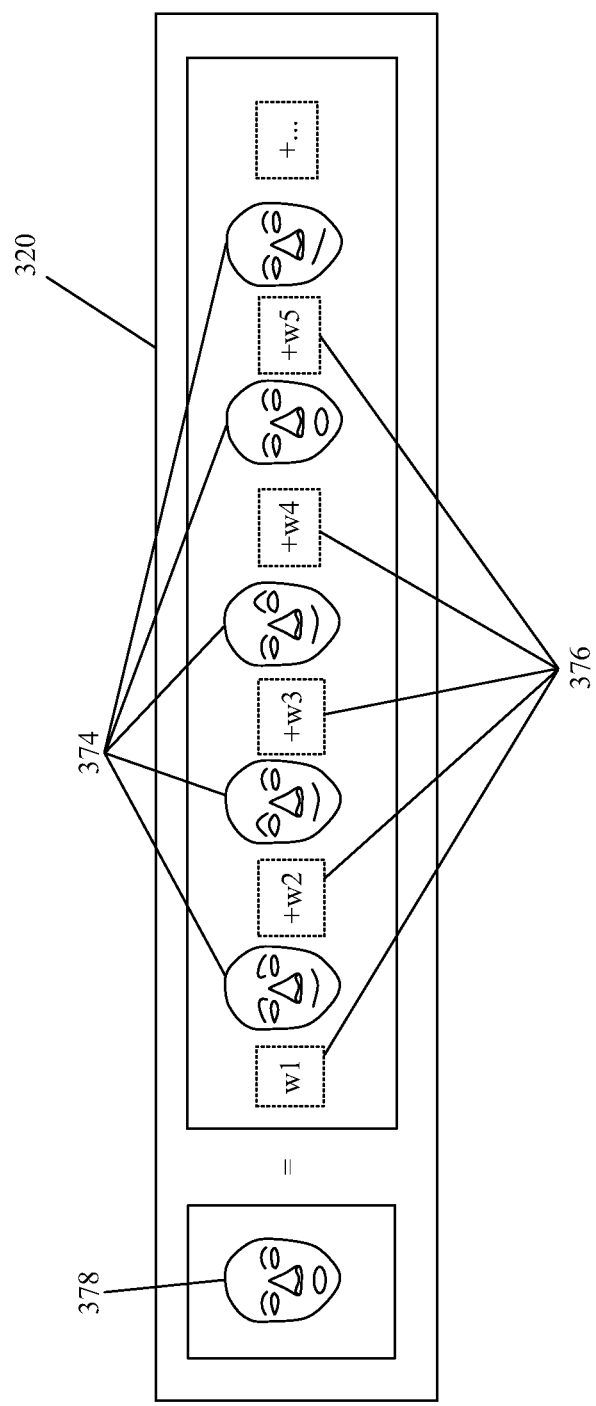

FIG. 3L illustrates the model-fitting operation for generating the 3D face model of the face of the first user 110 in a particular arbitrary facial expression. With reference to FIG. 3L, there is shown a second 3D face model 378, a set of blend shapes 374 and weight coefficients 376 for each blend shape from the set of blend shapes. In FIG. 3L the operation of model fitting for an arbitrary facial expression (i.e. operation 320 of FIG. 3A) that is related to the generation of 3D face model of the first user 110 in an arbitrary facial expression of the face of the first user 110 in the processing pipeline of FIG. 3A, is further described in details.

A face model with a desired particular arbitrary facial expression for the first user 110 may be considered as a combination of the plurality of blend shapes 374. The face modeler 212 may be configured to estimate the weight coefficients 376 for each blend shape which would be required to achieve a particular arbitrary facial expression for the 3D face model of the face of the first user 110. The face modeler may be configured to generate the second 3D face model 378 for the face of the first user 110 in a particular arbitrary facial expression. The second 3D face model 376 of the face of the first user 110 may be generated by using equation (10) as shown below.

$$F = b_o + (b_i - b_o)e \qquad (10),$$

where F represents the second 3D face model 378;
$b_o$ represents the neutral expression of the face of the first user 110;
$b_i$ represents the blend shapes 374 of the face of the first user 110;
e represents the coefficients;
The value of the coefficients of the different blend shapes 374 may be calculated by using equation (11) as shown below, $$\min_e \sum_{i=1}^{n} \|v_i - F_i\|^2 + w' \sum_{j=1}^{m} \|v_j - F_j\|^2 \qquad (11)$$

Where $v_i$, $F_i$ represents vertex on the model and its correspondence from the point cloud (n);
$v_j$, $F_j$ represents landmarks on the model and its correspondence from the point cloud (m);
w' represents weights for the landmarks.

Figure 4A:
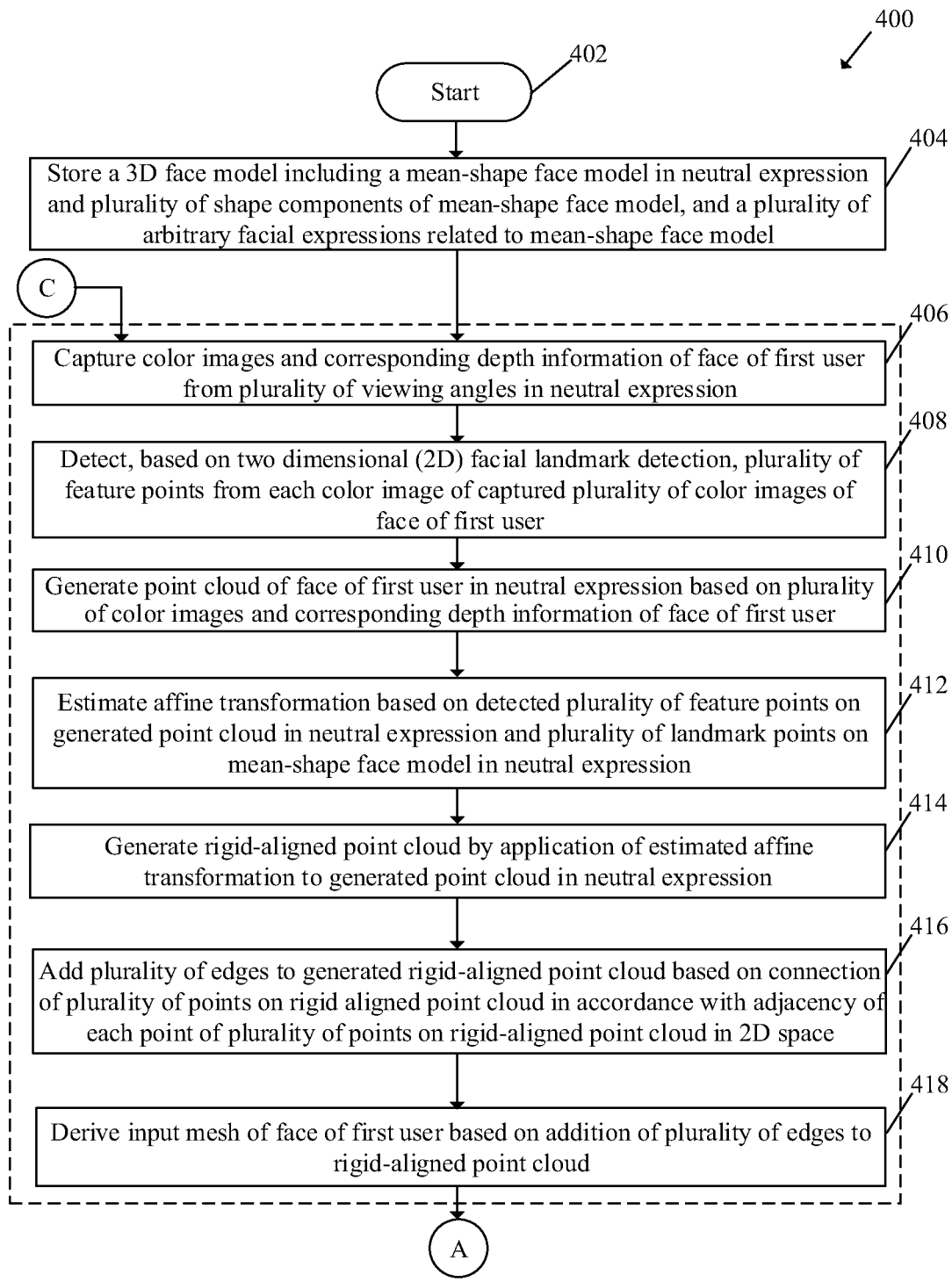
FIGS. 4A, 4B, and 4C, collectively, depicts a flowchart that illustrates exemplary operations to generate realistic 3D human face model using image and depth data, in accordance with an embodiment of the disclosure.
Figure 4B:
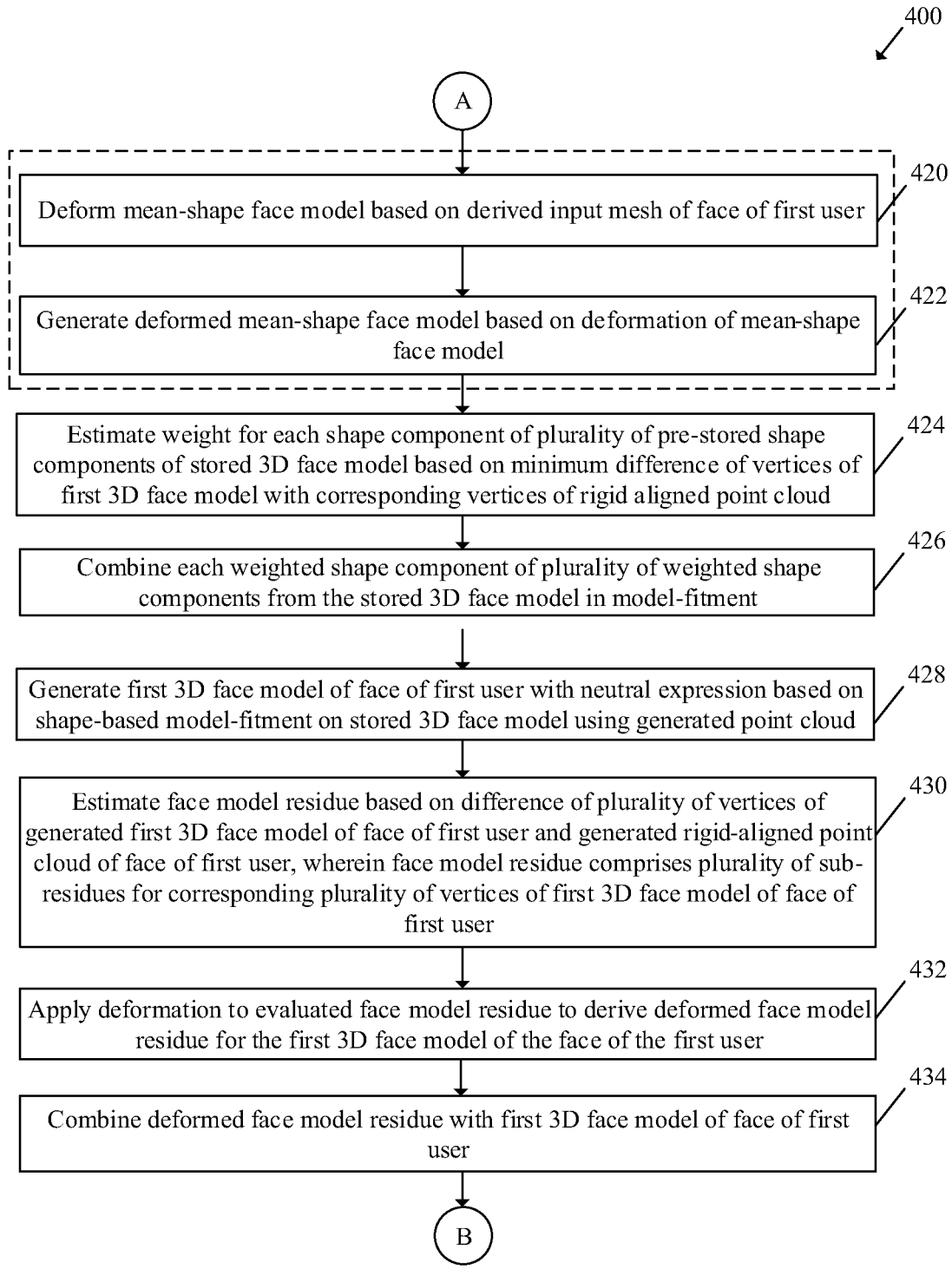
Figure 4C:
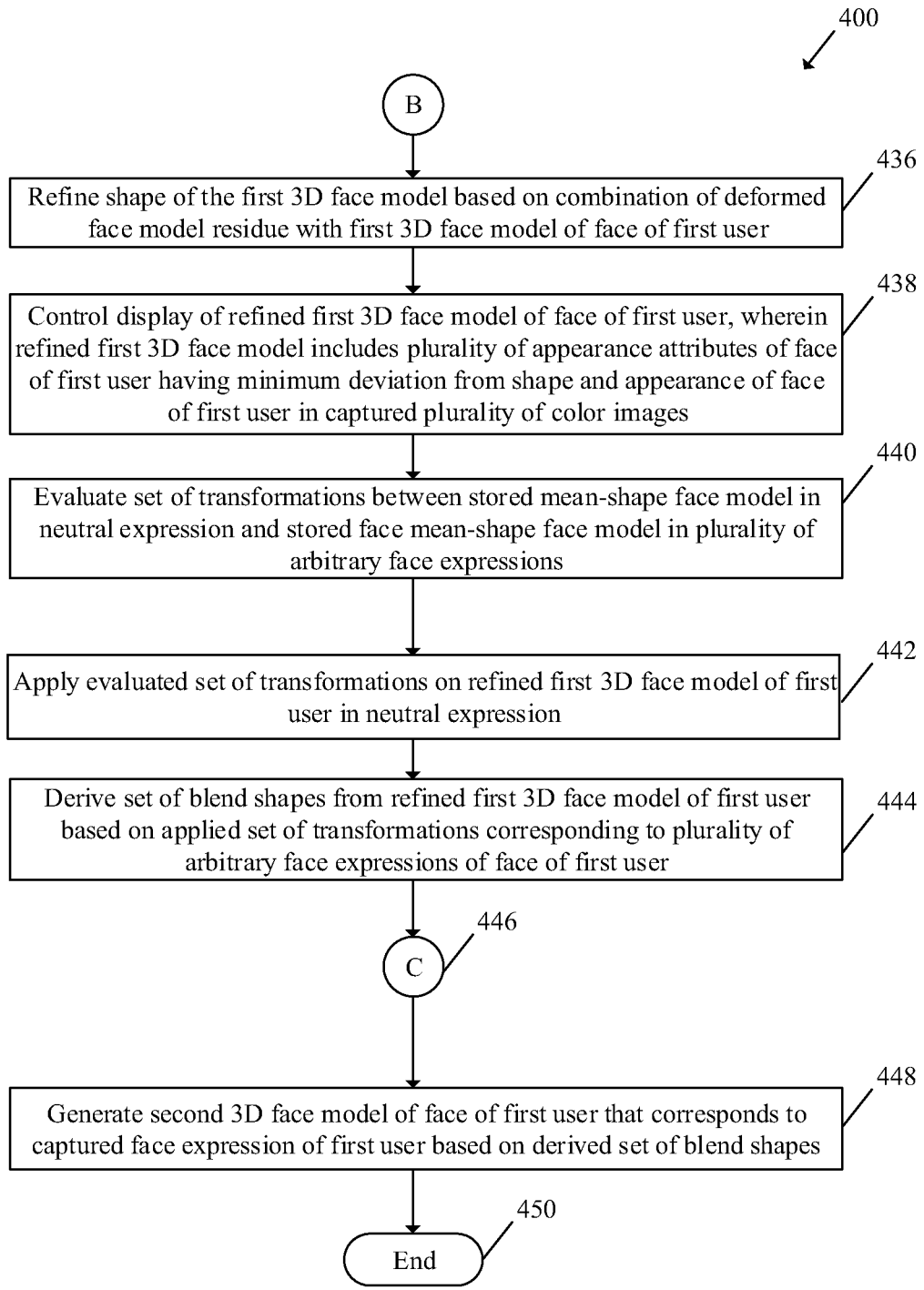

FIGS. 4A, 4B, and 4C, collectively, depicts a flowchart that illustrates exemplary operations to generate realistic 3D human face model using a virtual reality-based apparatus, in accordance with an embodiment of the disclosure. With reference to FIGS. 4A, 4B, and 4C, there is shown a flowchart 400. The flowchart 400 is described in conjunction with FIGS. 1, 2, and 3A to 3L. The operations 404 to 446 may be implemented in the VR-based apparatus 102. The flowchart 400 start at 402 and proceed to 404.

At 404, a 3D face model may be stored in the VR-based apparatus 102. The VR-based apparatus may also store a mean-shape face model in the neutral expression and a plurality of shape components of the mean-shape face model as a part of the stored 3D face model. The VR-based apparatus 102 may further be configured to store a plurality of arbitrary facial expressions related to the mean-shape face model. The plurality of arbitrary facial expressions of the mean-shape face model may be stored as expression templates of different arbitrary facial expressions.

At 406, a plurality of color images and corresponding depth information of the face of the first user 110 may be captured from one or more viewing angles in a neutral facial expression. The plurality of color images and corresponding depth information of the face of the first user 110 may be captured by the sensing device 106. The captured color images and corresponding depth information may be aligned with respect to each other. The VR-based apparatus 102 may be configured to receive the plurality of color images and corresponding depth information of the face of the first user 110 from the sensing device 106, via a communication network 108.

At 408, the plurality of feature points 326 from the aggregate color image 324 of the captured plurality of color images of the face of the first user 110 may be detected. The plurality of feature points 326 may be detected based on a 2D facial landmark detection, by the VR-based apparatus 102. The detected plurality of feature points 326 may include feature points such as the eyes, nose, lips, or other feature points. An example, shown and described in FIG. 3B, depicts the detected plurality of feature points 326 from the aggregate color image 324.

At 410, a point cloud (e.g., the point cloud 330) of the face of the first user 110 in neutral expression may be generated, based on the plurality of color images and corresponding depth information of the face of the first user 110. The VR-based apparatus 102 may be configured to generate the point cloud 330 in neutral expression further based on the detected plurality of feature points 326 from the plurality of color images. The generated point cloud 330 may be a collection of data points that may represent the external surface of the face of the first user 110. An example, shown and described in FIG. 3B, depicts the generated point cloud 330 based on the detected plurality of feature points 326 from the aggregate color image 324.

At 412, an affine transformation may be estimated based on the detected plurality of feature points 326 on the generated point cloud 330 and a plurality of landmark points on the mean-shape face model 332. The affine transformation may be a method for linear mapping that preserves points, straight lines, and planes. The face modeler 212 may be configured to estimate an affine transformation between the 3D coordinates of the feature points 330A on the point cloud 330 and the landmarks 332A on the mean-shape face model 332, as shown for example in FIG. 3C.

At 414, a rigid aligned point cloud (e.g. the rigid aligned point cloud 334) may be generated based on the application of the estimated affine transformation on the generated point cloud 330 in neutral expression. The plurality of feature points 326 of the face of the first user 110 may be aligned in the rigid aligned point cloud 334. An example of generation of the rigid aligned point cloud 334 based on the applied affine transformation on the generated point cloud 330, is described in FIG. 3C.

At 416, a plurality of edges may be added to the generated rigid aligned point cloud 334. The addition of edges may be based on a connection of a plurality of points on the rigid aligned point cloud 334 in accordance with adjacency of each point of the plurality of points on the rigid aligned point cloud 334 in a 2D space.

At 418, an input mesh (e.g. the input mesh 336) of the face of the first user 110 may be derived based on the addition of the plurality of edges to the rigid aligned point cloud 334. An example of the input mesh 336 that is derived based on the addition of the plurality of edges to the rigid aligned point cloud 334, is described in FIG. 3D.

At 420, the mean-shape face model 332 may be deformed based on the derived input mesh 336 of the face of the first user 110. The face modeler 212 may be configured to deform the mean-shape face model 332 based on the derived input mesh 336 of the face of the first user 110.

At 422, a deformed mean-shape face model (e.g. the deformed mean-shape face model 338) of the face of the first user 110 may be generated based on the deformation of the mean-shape face model. An example, shown and described in FIG. 3D, depicts the deformed mean-shape face model 338 generated by the deformation of the mean-shape face model 332 based on the derived input mesh 336.

At 424, a weight (e.g. the weight coefficients 340) for each shape component of the plurality of pre-stored shape components 342 of the stored 3D face model may be estimated. The estimation may be done based on a minimum difference of vertices of the first 3D face model 344 with corresponding vertices of the rigid aligned point cloud 334.

At 426, each weighted shape component of the plurality of weighted shape components 342 from the stored 3D face model in the model-fitment may be combined to generate a first 3D face model 344 of the face of the first user 110. The face modeler 212 may be configured to combine each weighted shape component of the plurality of weighted shape components 342 to generate a first 3D face model 344 of the face of the first user 110, as shown for example in FIG. 3E.

At 428, a first 3D face model (e.g., the first 3D face model 344) of the face of the first user 110 with a neutral expression may be generated. The face modeler 212 may be configured to generate the first 3D face model 344 with the neutral expression based on a shape-based model-fitment operation on the stored 3D face model using the generated point cloud 330. An example, shown and described in FIG. 3E, depicts the generated first 3D face model 344 of the face of the first user 110 in a neutral expression based on the estimated weight coefficients 340 of each of the obtained shape components 342 for the face of the first user 110.

At 430, a face model residue (e.g., the residual 346) may be estimated based on a difference of a plurality of vertices of the generated first 3D face model 344 of the face of the first user 110 and the derived rigid aligned point cloud 334 of the face of the first user 110. The estimated face model residue (e.g., the residual 346) may comprise the plurality of sub-residues for the corresponding plurality of vertices of the first 3D face model 344 of the face of the first user 110.

At 432, a deformation may be applied to the estimated face model residue (e.g., the residual 346) to derive a deformed face model residue (e.g., the refined residual 350) for the first 3D face model 344 of the face of the first user 110. The estimated face model residue (e.g., the residual 346) may be deformed to optimize the estimated face model residue (e.g., the residual 346).

At 434, the deformed face model residue (e.g., the refined residual 350) may be combined with the first 3D face model 344 of the face of the first user 110. The shape refining circuitry 214 may be configured to combine the deformed face model residue (e.g., the refined residual 350) with the first 3D face model 344 of the face of the first user 110, as shown for example in FIG. 3F.

At 436, a shape of the first 3D face model 344 of the face of the first user 110 may be refined, based on the combination of deformed face model residue (e.g., the refined residual 350) with the first 3D face model 344 of the face of the first user 110. The shape of the first 3D face model 344 of the face of the first user 110 may be refined by the shape refining circuitry, as shown for example in FIG. 3F.

At 438, display of the refined first 3D face model 352 of the face of the first user 110 may be controlled. The refined first 3D face model 352 of the face of the first user 110 may include a plurality of appearance attributes of the face of the first user 110 having a minimum deviation from shape and appearance of the face of the first user 110 in the captured plurality of color images. Therefore, the display of the refined first 3D face model 352 may be realistic in nature and the appearance attributes of the face of the first user 110 may be visible clearly on the display screen 206A of the VR-based apparatus 102. The display of the refined first 3D face model 352 of the face of the first user 110 on the display screen 206A may be controlled by the VR-based apparatus 102. More pixels may be allocated to the face portion of the refined first 3D face model 352 during display control for enhanced and vivid visualization of the refined first 3D face model 352 as compared to other parts of a complete 3D model of the first user 110. Further, within the face portion, there may be some facial regions that are rich in features, such as lips, eyes, and forehead, which are more prominent when viewed on the display screen 206A. The facial regions which are rich in features may be allocated even higher number of pixels than the other regions of the face portion of the refined first 3D face model 352 during display.

At 440, a set of transformations between the stored mean-shape face model 332 in the neutral expression and the stored mean-shape face model in a plurality of arbitrary facial expressions may be evaluated. An example, shown and described in FIG. 3J, depicts the calculated total transformation 370 for achieving a particular expression from the mean-shape face model 332 in neutral expression. The transformation may be evaluated by the face modeler 212. The evaluated transformation includes the first transformation 366 for each vertex on the stored mean-shape face model and the transformation for each unmoved vertices 368 on the stored mean-shape face model.

At 442, the evaluated set of transformations may be applied on the refined first 3D face model 352 of the first user 110 in neutral expression. An example, shown and described in FIG. 3K, depicts the application of the calculated total transformation 370 on the refined first 3D face model 352 of the first user 110 in neutral expression by the face modeler 212.

At 444, a set of blend shapes 374 may be generated from the refined first 3D face model 352 of the first user 110 based on the applied set of transformations corresponding to the plurality of arbitrary facial expressions of the face of the first user 110. The generated set of blend shapes 374 may include the refined first 3D face model 352 of the face of the first user 110 in a plurality of arbitrary facial expressions corresponding to the stored mean-shape face model in a plurality of arbitrary facial expressions.

At 446, the operations from 406 to 422, may be repeated. However, at 446, instead of capturing a plurality of color images and corresponding depth information of the face of the first user 110 in a neutral facial expression (as discussed in 406), one or more color images and corresponding depth information of the face of the first user 110 may be captured for an arbitrary expression. Further, in case of arbitrary expression, image capture of one frontal view of the first user 110 in the arbitrary expression, may be sufficient. Accordingly, for the arbitrary expression, the alignment may be between a new point cloud of the face of the first user 110 for the arbitrary expression and the refined first 3D face model 352. Basically, for the second face model, we need a different point cloud or input mesh. In FIG. 3A, it is 314-318

At 448, a second 3D face model 378 of the face of the first user 110 may be generated. The generated second 3D face model 378 may correspond to the captured facial expression of the first user 110 based on the derived set of blend shapes 374. A 3D face model in a particular arbitrary facial expression may be considered as a combination of plurality of blend shapes. The VR-based apparatus 102 may estimate the weight coefficients 376 for each blend shape from the set of blend shapes 374 to achieve a particular arbitrary facial expression of the first user 110. An example, shown and described in FIG. 3L, depicts the combination of different blend shapes 374 required to generate a second 3D face model 378 of the face of the first user 110 in an arbitrary facial expression. The generated refined first 3D face model 352 of the face of the first user 110 in a neutral expression and the generated second 3D face model 378 of the face of the first user 110 in an arbitrary facial expression may be utilized in creation of virtual presence and gaming environments. The control may pass to the end 450.

In accordance with an embodiment of the disclosure, a virtual reality-based apparatus for generation of realistic 3D human face model is disclosed. The apparatus, such as the VR-based apparatus 102 (FIG. 1), may comprise a memory device (such as the memory 204) and one or more circuits (such as the processor 210, the face modeler 212, and the shape refining circuitry 214 (FIG. 2)) coupled to a sensing device (such as the sensing device 106). The memory 204 may be configured to store a mean-shape face model in neutral expression (such as the mean-shape face model 332 (FIG. 3C)) and a plurality of arbitrary facial expressions of the mean-shape face model. The processor 210 may be configured to receive a plurality of color images and corresponding depth information of the face, (such as the aggregate color image 324 in FIG. 3B) of a user (such as the first user 110 in FIG. 1). The face modeler 212 may be further configured to generate a point cloud (such as the point cloud 330 in FIG. 3B) of the face of the first user, based on the received plurality of color images and corresponding depth information of the face of the first user from the sensing device 106. The face modeler 212 may be further configured to generate a first 3D face model (e.g., the first 3D face model 344 of FIG. 3E) of the face of the first user 110 with a neutral expression. The first 3D face model may be generated by a shape-based model-fitment on the mean-shape face model 332 using the generated point cloud 330. The shape refining circuitry 214 may be configured to refine a shape of the first 3D face model 344 based on a difference between the first 3D face model 344 and the generated point cloud 330 of the face of the first user 110. The shape refining circuitry 214 may be further configured to generate a refined first 3D face model (such as the refined first 3D face model 352 in FIG. 3F) of the face of the first user 110. The processor 210 may further control display of the refined first 3D face model 352 of the face of the first user 110 on the VR-based apparatus 102 such that a plurality of appearance attributes on the refined first 3D face model 352 exhibit a minimum deviation from the shape and appearance of the face of the first user 110 in the captured plurality of color images.

In a conventional 3D virtual reality environment, there are several complexities involved in capturing the input image data from various viewing angles required to create the 3D face model of a user. Further, a conventional 3D model of the face of the user may not resemble actual facial details of the user. For instance, structure and surface representation of the human face may not resemble the face of the user and the expressions of the face model may not match the expressions of the human face. This discrepancy in the structure, features, and expressions of the 3D face model with respect to the actual face of the user may not be desirable for realistic and real time viewing purposes and virtual reality applications. Thus, in order to make a 3D human face model more realistically resemble to the actual human face, a shape of the generated 3D model is refined based on the captured facial details of the face of the user. This requires estimation of a difference between the generated 3D face model and the captured facial details of the face of the user. Consequently, display of such 3D face models that exhibits a discrepancy in the structure and surface representation of the human face may also generate unrealistic animation. Further, to generate the 3D face model of the face of the user in a plurality of arbitrary facial expressions, the user may be required to make different basic facial expressions and use the reconstructed model of them as blend shapes which may require a too much involvement of the user. Thus, to generate a 3D face model of the face of the user in a plurality of arbitrary facial expressions, a combination of blend shapes is used, wherein the blend shapes for different arbitrary facial expressions are generated based on the stored plurality of arbitrary facial expressions of the mean-shape face model.

The various embodiments of the disclosed apparatus, such as the VR-based apparatus 102, comprises one or more circuits, such the processor 210, the face modeler 212, and the shape refining circuitry 214, which may generate a 3D face model of a face of a user in a plurality of arbitrary facial expressions based on a plurality of color images and corresponding depth information of the face of the user received from a sensing device. Thus, the disclosed apparatus may generate a plurality of 3D face models in a plurality of arbitrary facial expressions based on the images and corresponding depth information of a plurality of users. Further, the disclosed apparatus may include a plurality of appearance attributes of the face of the user on the surface of the generated 3D face model, which more realistically resembles the appearance of the face of the user, as compare to the conventional animated 3D environment. For instance, structure and the surface representation of the generated 3D face model, such as the second 3D face model may be similar to that of the structure and the surface representation of the face of the user. Thus, the face modeler 212 and the shape refining circuitry 214, enables an apparatus, such as the VR-based apparatus 102, to generate and display realistic 3D face model of the user. The apparatus, such as the VR-based apparatus 102, is able to generate realistic 3D face model of the face of the user by use of the images and corresponding depth information of the face of the user received by the sensing device 106, thereby providing a specific improvement in 3D virtual reality environment.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits communicatively coupled to a sensing device. The set of instructions may be executable by the machine and/or the computer to perform the steps that comprise the storage of a plurality of arbitrary facial expressions of the mean-shape face model. A plurality of color images and corresponding depth information of a face of a user from different viewing angles may be received from a sensing device. A point cloud of the face of the user may be generated based on the received plurality of color images and corresponding depth information of the face of the user. The first 3D face model of the face of the user in a neutral expression may be generated by a shape-based model-fitment on the mean-shape face model using the generated point cloud. The refined first 3D face model of the face of the first user 110 may be generated by refining the shape of the first 3D face model based on a difference between the first 3D face model, the shape-based model-fitment, and the generated point cloud of the face of the first user. The display of the refined first 3D face model of the face of the first user on the display screen 206A may be controlled on the VR-based apparatus 102 such that a plurality of appearance attributes on the refined first 3D face model exhibit a minimum deviation from the shape and appearance of the face of the first user in the captured plurality of color images.

In accordance with an exemplary aspect of the disclosure, the VR-based apparatus 102 may be a virtual-reality or augmented-reality based device. Thus, the operations executed by the VR-based apparatus 102 as described in the present disclosure, may also be executed by the virtual-reality or augmented-reality based device. For example, the virtual-reality based device may present a second 3D face model, such as the second 3D face model 378, of a first human to a second human. The second 3D face model 378 may mimic the face of the first human in a plurality of arbitrary facial expressions in real time or near-real time. The second 3D face model 378 may also be textured with image data to resemble the face of the first human. Thus, the display of the second 3D face model 378 by the virtual reality based device creates a virtual presence of the first human in a remote location, for the second human.

In accordance with another exemplary aspect of the disclosure, the VR-based apparatus 102 may be a gaming device. Thus, the operations executed by the VR-based apparatus 102 as described in the present disclosure, may also be executed by the gaming device. For example, the gaming device may present a gaming character, such as the second 3D face model 378, in a gaming environment to a player. The gaming device may further cause the gaming character to imitate one or more poses of the face of the player. This may enable the player to control movement of the gaming character in the gaming environment. For example, in the event the player starts to move his head, the gaming character may imitate the moving head of the player. The gaming environment may also be a multiplayer game. In such a case, the gaming device may present a plurality of gaming characters, each imitating one of the multiple players in the multiplayer game.

In accordance with yet another exemplary aspect of the disclosure, the VR-based apparatus 102 may be a 3D model-based conferencing system. Thus, the operations executed by the VR-based apparatus 102 as described in the present disclosure, may also be executed by the 3D model-based conferencing system. Usually, the conventional video conferencing systems require a high network bandwidth for a seamless transmission of video. In an event that the requirement of network bandwidth is not fulfilled, video conferencing is hindered. The 3D model based conferencing device, such as the VR-based apparatus 102, enables video less conferencing that may not require a high network bandwidth for video transmission. For example, the 3D model based conferencing device may track one or more facial expressions a first person involved in conferencing. The 3D model based conferencing device may then animate a second 3D face model, such as the second 3D face model 378, based on the tracked one or more facial expressions of the first person. The animated second 3D face model may be presented along with recorded audio of the first person to a second person involved in the conferencing. The 3D model based conferencing device may further present another animated 3D face model to the first person that imitates one or more facial expressions of the second person. Thus, the 3D model based conferencing device enables the first person and the second person to participate in conferencing.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A virtual reality-based apparatus, comprising:
a memory device configured to store a three dimensional (3D) face model; and
circuitry communicatively coupled to a sensing device, wherein the circuitry is configured to:
generate a point cloud of a face of a first user based on a plurality of color images of the face of the first user and depth information of the face of the first user in each image of the plurality of color images,
wherein the plurality of color images and the corresponding depth information of the first user is captured by the sensing device from different viewing angles of the face in a neutral expression;
detect, based on a two dimensional (2D) facial landmark detection, a plurality of feature points on the generated point cloud from each color image of the plurality of color images of the face of the first user;
estimate an affine transformation, based on the detected plurality of feature points and a plurality of landmark points on a mean-shape face model;
generate a rigid aligned point cloud by application of the estimated affine transformation to the generated point cloud;
generate a first 3D face model of the face of the first user with the neutral expression, based on a shape-based model-fitment on the stored 3D face model and the generated rigid aligned point cloud;
evaluate a face model residue based on a difference of a plurality of vertices of the generated first 3D face model of the face of the first user and the generated rigid aligned point cloud of the face of the first user, wherein the face model residue comprises a plurality of sub-residues for the corresponding plurality of vertices of the generated first 3D face model of the face of the first user;
refine a shape of the generated first 3D face model, wherein the refinement of the shape of the generated first 3D face model is based on the shape-based model-fitment and the evaluated face model residue; and
control display of the refined shape of the generated first 3D face model of the face of the first user on the virtual reality-based apparatus such that a plurality of appearance attributes on the refined shape of the generated first 3D face model exhibit a minimum deviation from an actual shape of the face of the first user and appearance of the face of the first user in the plurality of color images.

2. The virtual reality-based apparatus according to claim 1, wherein:
the memory device is further configured to store the mean-shape face model in the neutral expression and a plurality of shape components of the mean-shape face model as a part of the stored 3D face model, and
a plurality of arbitrary facial expressions related to the mean-shape face model.

3. The virtual reality-based apparatus according to claim 1, wherein the circuitry is further configured to:
add a plurality of edges to the generated rigid aligned point cloud based on connection of a plurality of points on the generated rigid aligned point cloud,
wherein the connection of the plurality of points on the generated rigid aligned point cloud is based on adjacency of each point of the plurality of points on the generated rigid aligned point cloud in a 2D space; and
derive an input mesh of the face of the first user based on the addition of the plurality of edges to the generated rigid aligned point cloud.

4. The virtual reality-based apparatus according to claim 3, wherein the circuitry is further configured to:
deform the mean-shape face model based on the derived input mesh of the face of the first user.

5. The virtual reality-based apparatus according to claim 1, wherein the circuitry is further configured to:
estimate a weight for each shape component of a plurality of shape components of the stored 3D face model based on a minimum difference of vertices of each shape component with corresponding vertices of the rigid aligned point cloud;
combine each weighted shape component of the plurality of weighted shape components from the stored 3D face model in the shape-based model-fitment for generation of the first 3D face model of the face of the first user.

6. The virtual reality-based apparatus according to claim 1, wherein the circuitry is further configured to:
generate a deformed face model residue for the generated first 3D face model of the face of the first user based on deformation of the evaluated face model residue; and combine the deformed face model residue with the generated first 3D face model of the face of the first user to obtain the refined shape of the first 3D face model of the face of the first user.

7. The virtual reality-based apparatus according to claim 6, wherein the deformation of the evaluated face model residue is a Laplacian deformation.

8. The virtual reality-based apparatus according to claim 1, wherein the circuitry is further configured to evaluate a set of transformations between the mean-shape face model in the neutral expression stored in the memory device and mean-shape face models of a plurality of arbitrary facial expressions stored in the memory device.

9. The virtual reality-based apparatus according to claim 8, wherein the circuitry is further configured to:
  apply the evaluated set of transformations on the refined shape of the first 3D face model of the first user in the neutral expression; and
  derive a set of blend shapes from the refined shape of the first 3D face model of the first user based on the applied set of transformations corresponding to the plurality of arbitrary facial expressions of the face of the first user.

10. The virtual reality-based apparatus according to claim 9, wherein the circuitry is further configured to generate a second 3D face model of the face of the first user that corresponds to a particular arbitrary facial expression from the plurality of arbitrary facial expressions of the first user based on the derived set of blend shapes.

11. A method for generating realistic three dimensional (3D) human face models, the method comprising:
  in a virtual reality-based apparatus comprising a memory device and circuitry communicatively coupled to a sensing device:
  storing, by the circuitry, a 3D face model in the memory device;
  generating, by the circuitry, a point cloud of a face of a first user based on a plurality of color images of the face of the first user and depth information of the face of the first user in each image of the plurality of color images, wherein the plurality of color images and the corresponding depth information of the first user is captured by the sensing device from different viewing angles of the face in a neutral expression;
  detecting, by the circuitry, a plurality of feature points on the generated point cloud, based on a two dimensional (2D) facial landmark detection, from each color image of the plurality of color images of the face of the first user;
  estimating, by the circuitry, an affine transformation, based on the detected plurality of feature points and a plurality of landmark points on a mean-shape face model;
  generating, by the circuitry, a rigid aligned point cloud by application of the estimated affine transformation to the generated point cloud;
  generating, by the circuitry, a first 3D face model of the face of the first user with the neutral expression, based on a shape-based model-fitment on the stored 3D face model and the generated rigid aligned point cloud;
  evaluating, by the circuitry, a face model residue based on a difference of a plurality of vertices of the generated first 3D face model of the face of the first user and the generated rigid aligned point cloud of the face of the first user, wherein the face model residue comprises a plurality of sub-residues for the corresponding plurality of vertices of the generated first 3D face model of the face of the first user;
  refining, by the circuitry, a shape of the generated first 3D face model,
    wherein the refinement of the shape of the generated first 3D face model is based on the shape-based model-fitment and the evaluated face model residue; and
  controlling, by the circuitry, display of the refined shape of the generated first 3D face model of the face of the first user on the virtual reality-based apparatus such that a plurality of appearance attributes on the refined shape of the generated first 3D face model exhibit a minimum deviation from an actual shape of the face of the first user and appearance of the face of the first user in the plurality of color images.

12. The method according to claim 11, further comprising:
  adding, by the circuitry, a plurality of edges to the generated rigid aligned point cloud based on connection of a plurality of points on the generated rigid aligned point cloud,
    wherein the connection of the plurality of points on the generated rigid aligned point cloud is based on adjacency of each point of the plurality of points on the generated rigid aligned point cloud in a 2D space; and
  deriving, by the circuitry, an input mesh of the face of the first user based on the addition of the plurality of edges to the generated rigid aligned point cloud.

13. The method according to claim 12, further comprising:
  deforming, by the circuitry, the mean-shape face model based on the derived input mesh of the face of the first user.

14. The method according to claim 11, further comprising:
  generating, by the circuitry, a deformed face model residue for the generated first 3D face model of the face of the first user based on deformation of the evaluated face model residue; and
  combining, by the circuitry, the deformed face model residue with the generated first 3D face model of the face of the first user to obtain the refined shape of the first 3D face model of the face of the first user.

* * * * *